(12) United States Patent
Shi et al.

(10) Patent No.: US 8,342,833 B2
(45) Date of Patent: Jan. 1, 2013

(54) THREE-DIMENSIONAL OBJECT FORMING APPARATUS

(75) Inventors: Kwo Yuan Shi, Hsin-Chu (TW); Ya Ching Tung, Hsin-Chu (TW)

(73) Assignee: Microjet Technology Co., Ltd., Hsin-Chu (TW)

( * ) Notice: Subject to any disclaimer, the term of this patent is extended or adjusted under 35 U.S.C. 154(b) by 500 days.

(21) Appl. No.: 12/659,843

(22) Filed: Mar. 23, 2010

(65) Prior Publication Data

US 2010/0247703 A1    Sep. 30, 2010

(30) Foreign Application Priority Data

Mar. 31, 2009  (CN) .......................... 2009 1 0130561
Nov. 4, 2009   (CN) .......................... 2009 1 0208358

(51) Int. Cl.
    *B28B 17/00*    (2006.01)
(52) U.S. Cl. ........ 425/375; 425/169; 425/225; 425/217; 425/90; 425/130; 264/308; 264/37.29; 222/233

(58) Field of Classification Search ............... 425/174.4, 425/169, 375, 73, 74, 210, 225, 217, 90, 425/93, 216, 130, 215; 264/497, 308, 113, 264/37.29, 101; 118/712, 66, 602, 600, 308, 118/309, 313, 314, 315, 316; 222/409, 414, 222/DIG. 1, 233, 238, 367, 361, 336, 354, 222/355, 216, 303, 369, 412, 413; 141/8, 141/98; 366/329.1, 329.2

See application file for complete search history.

(56) References Cited

U.S. PATENT DOCUMENTS

| | | | | |
|---|---|---|---|---|
| 6,824,714 | B1 * | 11/2004 | Turck et al. ................. | 264/40.1 |
| 7,073,442 | B2 * | 7/2006 | Fedor et al. .................. | 101/480 |
| 2002/0079601 | A1 * | 6/2002 | Russell et al. ............... | 264/40.1 |
| 2005/0280185 | A1 * | 12/2005 | Russell et al. ................ | 264/308 |

\* cited by examiner

*Primary Examiner* — Yogendra Gupta
*Assistant Examiner* — Ninh Le
(74) *Attorney, Agent, or Firm* — Bacon & Thomas, PLLC

(57) ABSTRACT

A three-dimensional object forming apparatus for forming a three-dimensional object includes: a base platform; a transmission portion; a detachable construction tank; a movable powder supplying tank provided for driving to supply construction powder above the detachable construction tank; a print module including at least a print cartridge with at least a nozzle; a heating portion; an lifting portion arranged below the detachable construction tank; a nozzle cleaning module; a nozzle sealing module having a holder, at least a sealing portion and a moisture portion; and a stretchable dust-proof cover connected to a side of the powder supplying tank, which is provided for moving together with the powder supplying tank to cover the construction powder in the construction tank.

18 Claims, 32 Drawing Sheets

THREE-DIMENSIONAL OBJECT FORMING APPARATUS

BACKGROUND OF THE INVENTION

1. Field of the Invention

The present invention relates to a three-dimensional object forming apparatus and, more particularly, to a desk-top three-dimensional object forming apparatus.

2. Description of Related Art

The rapid prototyping (RP) technology is developed from the idea of forming a pyramid by stacking layers, and the main technical feature is to achieve fast formation. A complicated design can be transformed into a three-dimensional physical model automatically fast without any cutting tools, moulds and fixtures. Thus, the development cycle of new products and research and development cost are largely reduced to ensure time to market for new products and first-time-right ratio. Accordingly, a complete and convenient product design tool is provided between technicians and non-technicians, such as managers and users, and the product competitiveness and the quick reaction capability of enterprises in the market are improved obviously.

Recently, rapid prototyping technology develops a method for producing three-dimensional physical models by combining jet printing and precise positioning of carriers. The producing method begins by first spreading a layer of powder on the carrier and then printing high viscosity liquid binder on part of the powder by using jet printing technology, the liquid binder and the powder stick together to become solidified. By repeating the above steps, a three-dimensional physical model is produced by stacking multiple layers.

However, whether the residual binder and the powder sticking on the surface of the nozzles are scraped clean is not considered in the conventional printing equipment used by rapid prototyping technology when scraping ink after printing. Moreover, sealing without moisturizing makes binder drying, resulting in damaging the nozzles. Thus, the useful lifetime of nozzles is reduced, and the printing function becomes too poor to produce high quality three-dimensional products. Moreover, in the prior rapid prototyping technology, the flying dust always pollutes the working environment when taking the finished products out, hence frequent cleaning is required to maintain normal operation. Besides, it takes time to wait for drying after each powder spreading and after completing printing, and thus the total forming time increases and it also takes several hours to wait for the products drying after forming. The finished products may be damaged if the forming strength is not enough or users take them carelessly. Therefore, the finished products should be taken out after becoming strong enough, and thus the purpose of fast formation cannot be achieved.

Therefore, it is desirable to provide a three-dimensional object forming apparatus to mitigate and/or obviate the aforementioned problems.

SUMMARY OF THE INVENTION

An object of the present invention is to provide a three-dimensional object forming apparatus with a detachable construction tank for saving drying time, which can provide several construction tanks for replacing with each other, and the finished product can be placed reversely on another powder sieving device after being taken out, to achieve the convenience of easily taking out and the purpose of saving time.

Another object of the present invention is to provide a three-dimensional object forming apparatus, which solves the problems of the conventional three-dimensional object forming apparatuss that the nozzles cannot be thoroughly cleaned up and the nozzles are damaged owing to becoming dried and blocked, which is caused by the nozzles not being moisturized when sealing, resulting in that the useful lifetime of the nozzles is reduced and the printing function becomes too poor to produce high quality three-dimensional products.

A further object of the present invention is to provide a three-dimensional object forming apparatus with a detachable construction tank, which solves the problem that the working environment is easily polluted by the flying dust when taking the finished products out, and frequent cleaning is required to maintain normal operation.

To achieve the objects, a three-dimensional object forming apparatus for forming a three-dimensional object is provided. The three-dimensional object forming apparatus comprises a base platform; a detachable construction tank arranged on the base platform, comprising a tank body and a base plate; a movable powder supplying tank arranged on the base platform, provided for driving by a transmission portion to supply construction powder above the construction tank; a print module arranged on the base platform, comprising at least a print cartridge with at least a nozzle; a heating portion installed on the front end of the movable powder supplying tank, provided for performing heating process after each printing; an lifting portion arranged on the base platform, comprising a lifting platform and a loading platform, wherein the lifting platform is located under the construction tank for carrying the base plate of the construction tank to control the lifting height of the base plate during the process of forming the three-dimensional object, and the loading platform is used for carry the tank body of the detachable construction tank; a nozzle cleaning module arranged on the base platform, comprising a spray portion and at least a wiper, wherein the spray portion disperses liquid to the at least a nozzle by using a spray pipe; a nozzle sealing module arranged on the base platform, comprising a holder, at least a sealing portion and a moisture portion; and a stretchable dust-proof cover connected to a side of the powder supplying tank, provided for moving together with the powder supplying tank to cover the construction powder in the construction tank.

Other objects, advantages, and novel features of the invention will become more apparent from the following detailed description when taken in conjunction with the accompanying drawings.

DETAILED DESCRIPTION OF THE PREFERRED EMBODIMENT

Several typical embodiments showing the features and advantages of the present invention are explained in relation in the following paragraphs, and it is to be understood that many other possible modifications and variations can be made without departing from the spirit and scope of the invention as hereinafter claimed.

Figure 1A:
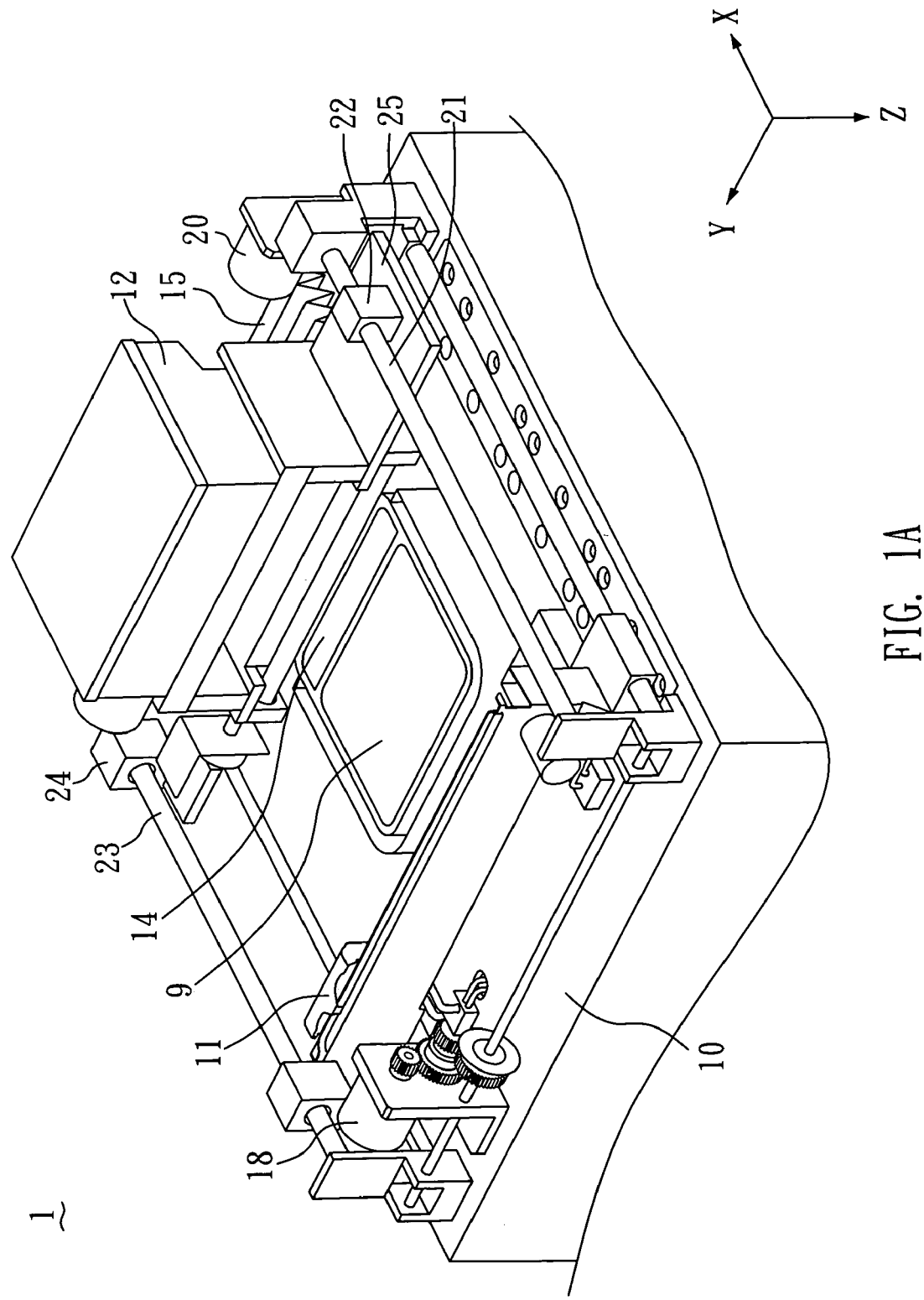
FIG. 1A is a three-dimensional structure diagram of the desk-top three-dimensional object forming apparatus according to one preferred embodiment of the invention.
Figure 1B:
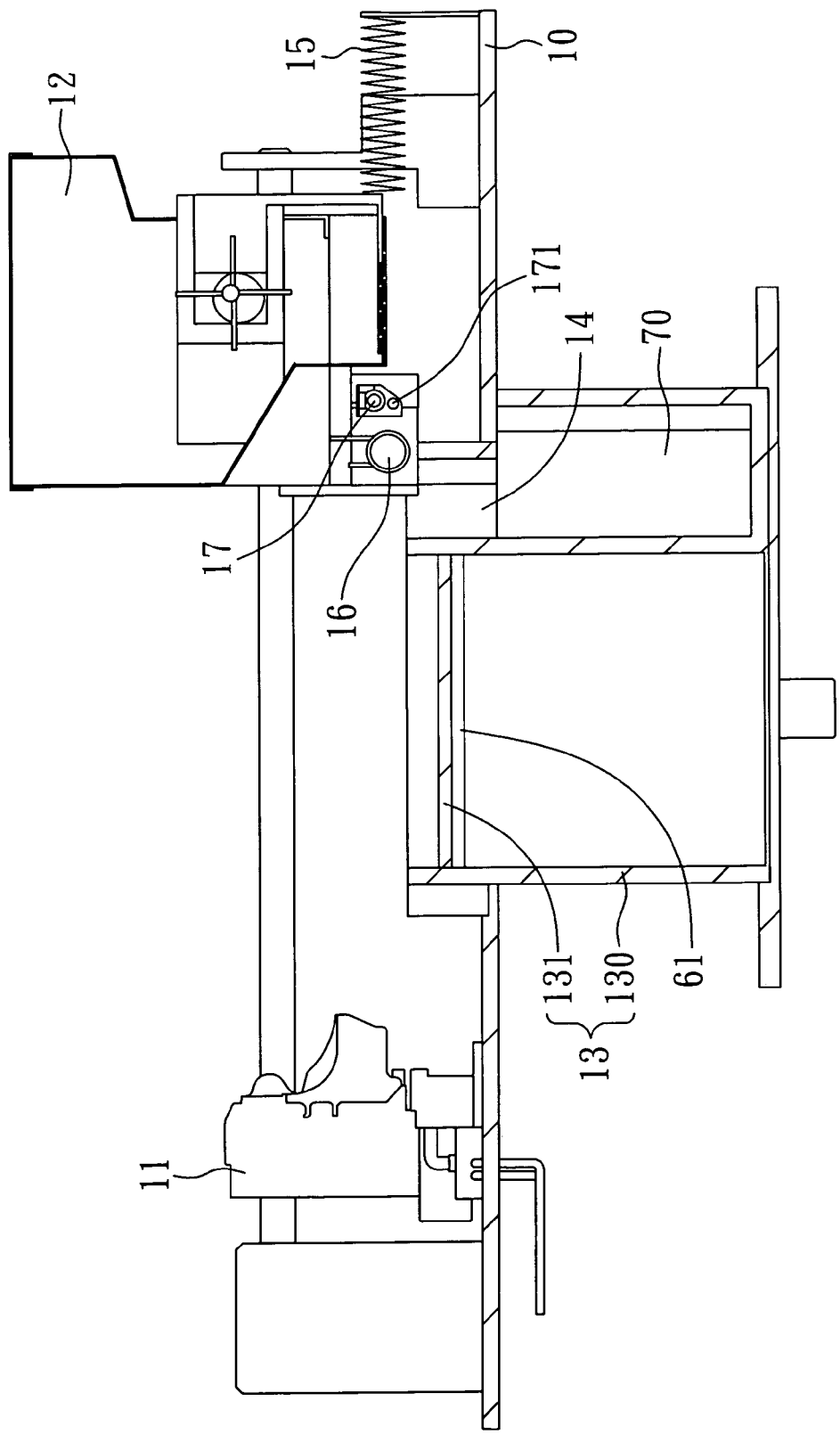
FIG. 1B is a partial cross-sectional view of the print module, the powder supplying tank and the construction tank in FIG. 1A.
Figure 3A:
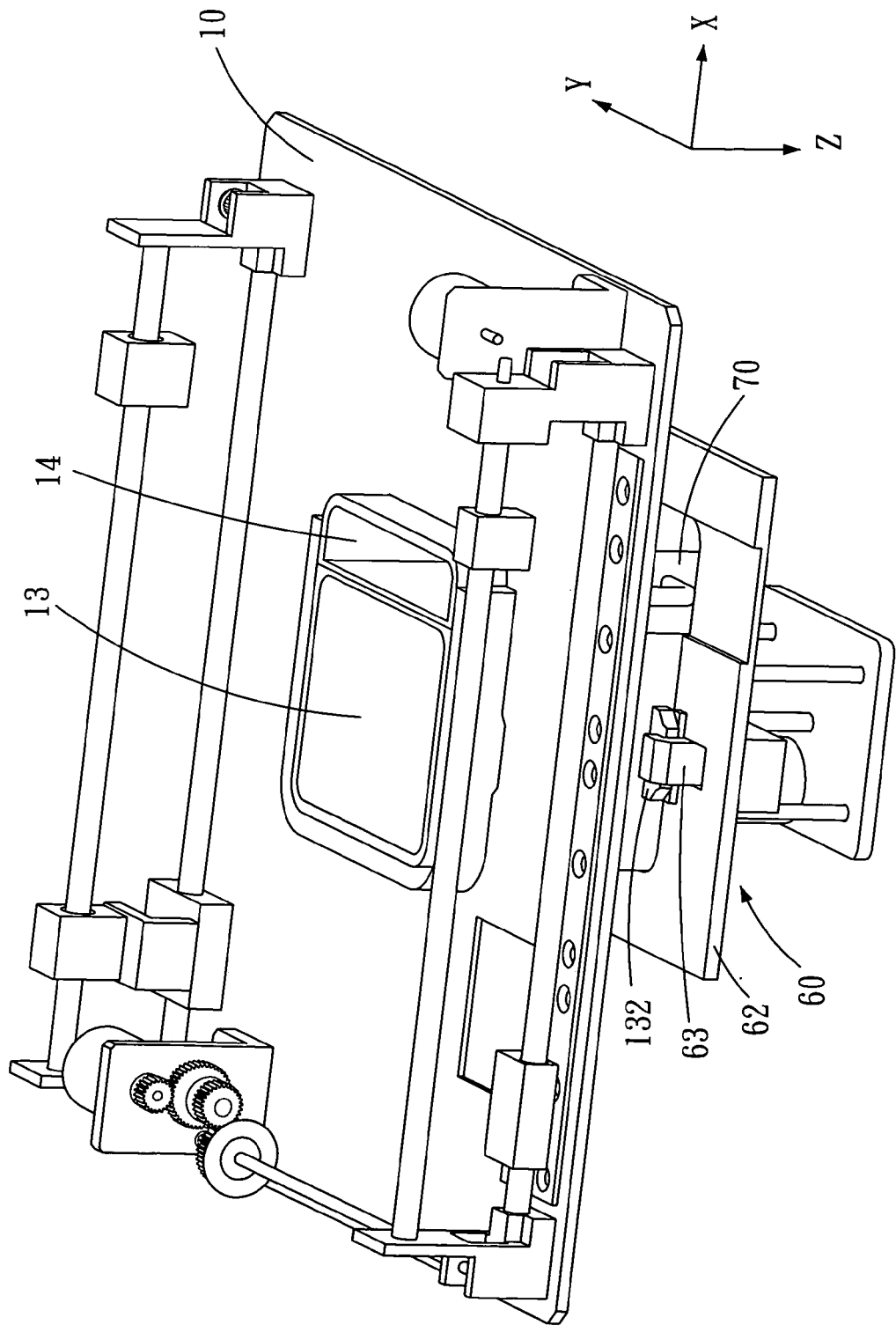
FIG. 3A is a partial structure diagram of the desk-top three-dimensional object forming apparatus according to the invention.

Please refer to FIG. 1A. FIG. 1A is a three-dimensional structure diagram illustrating the desk-top three-dimensional object forming apparatus in accordance with one preferred embodiment of the invention. As shown in FIG. 1A, the base platform 10 of the desk-top three-dimensional object forming apparatus 1 includes a print module 11, a powder supplying tank 12 and a construction tank 13, wherein the tank body 130 of the construction tank 13 (as shown in FIG. 1B) is extended from the base platform 10 and partially installed on the base platform 10. The powder supplying tank 12 is provided for supplying construction powder into the construction tank 13 to process printing by the print module 11, thereby forming the desired three-dimensional object in the construction tank 13 by stacking layers. The construction tank 13 has a base plate 131 inside (as shown in FIG. 1B) for loading construction powder and the three-dimensional object formed by stacking layers, and the base plate 131 is fixed on the lifting platform 61 (as shown in FIG. 1B) for being driven by the lifting portion 60 (as shown in FIG. 3A) to rise and fall in the construction tank 13.

Figure 1C:
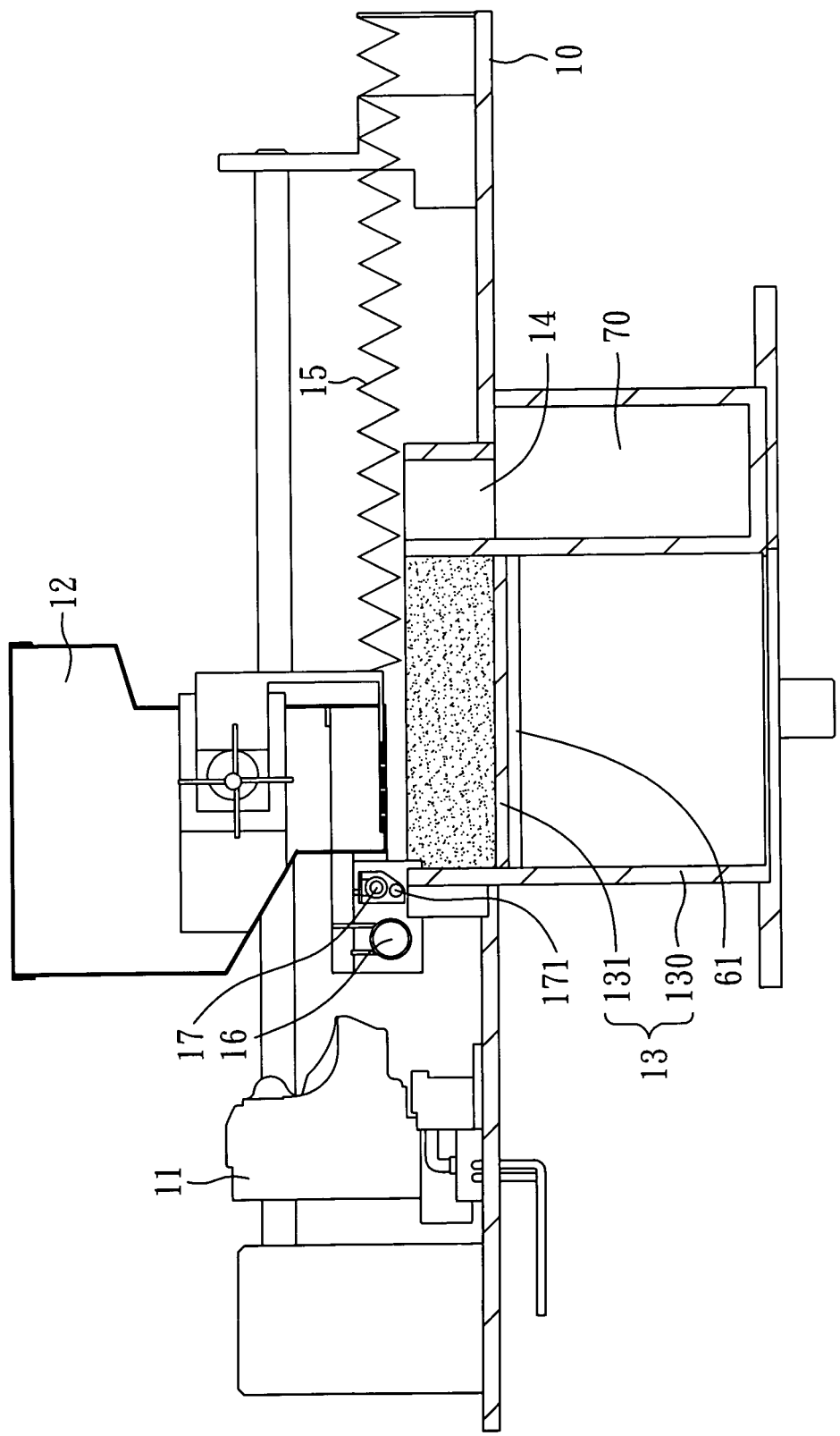
FIG. 1C is a schematic diagram of the powder supplying tank above the construction tank for supplying construction powder.

In an embodiment, the construction tank 13 is installed in the center of the desk-top three-dimensional object forming apparatus 1, the print module 11 is installed in the left side of the construction tank 13, and the powder supplying tank 12 is installed in the right side of the construction tank 13. In this embodiment, the printing method is illustrated in the way that the print module 11 moves from left to right along the X-axis, but it is not limited in actual applications. Please refer to FIG. 1A, FIG. 1B and FIG. 1C, wherein FIG. 1B is a partial cross sectional view of the print module 11, the powder supplying tank 12 and the construction tank 13 in FIG. 1A, and FIG. 1C is a schematic diagram of the powder supplying tank 12 above the construction tank 13 for supplying construction powder. The operating of the desk-top three-dimensional object forming apparatus 1 is as follows. First, the powder supplying tank 12 moves from the right side to the upper of the construction tank 13 along the X-axis, and spreads powder on the base plate 131 of the construction tank 13 simultaneously. After spreading powder, the powder supplying tank 12 moves back to the original location, and the powder spreading wheel 16 in the left side of the powder supplying tank 12 bulldozes and presses the powder to spread powder on the whole surface of the base plate 131 of the construction tank 13, and redundant powder can be pushed into the recycling tank 14 for recycling.

In an embodiment, the desk-top three-dimensional object forming apparatus 1 further comprises a print forming and powder separating operation module, which includes a stretchable dust-proof cover 15 connected to the right side of the powder supplying tank 12. The stretchable dust-proof cover 15 is simultaneously stretched to cover the whole construction tank 13 when the powder supplying tank 12 moves left and spreads powder on the construction tank 13, and the spreading powder is also covered at the same time to prevent powder flying. A dustproof effect is provided for the elements on the base platform 10, especially to the transmission portion. The stretchable dust-proof cover 15 prevents the flying dust from sticking on the transmission portion, which could affect the useful lifetime and the printing precision. Meanwhile, the powder is covered on the construction tank 13 after spreading powder, and then the print module 11 proceeds to print. Thus, the amount of flying dust can be reduced substantially, and it is different from the conventional forming device that causes a large amount of flying dust when spreading powder and printing.

Please refer to FIG. 1A, the desk-top three-dimensional object forming apparatus 1 further comprises a first transmission portion for driving the powder supplying tank 12 to move along the X direction. The first transmission portion includes a motor 20, a ball screw 21, a bush 22, a linear slider 23 and a sleeve 24, wherein the bush 22 is set on the ball screw 21, the sleeve 24 is set on the linear slider 23, and the ball screw 21 and the linear slider 23 are set across the powder supplying tank 12 and parallel to each other. As shown in FIG. 1A, the powder supplying tank 12 is fixed on a loading board 25, and the bush 22 and the sleeve 24 are respectively connected and fixed to the loading board 25. Thus, the bush 22 reciprocates on the ball screw 21 when the motor 20 drives the ball screw 21 to rotate, and then drives the powder supplying tank 12 to move along the X direction. By setting up the movable powder supplying tank 12, the desk-top three-dimensional object forming apparatus 1 has a better spatial configuration.

After the powder supplying tank 12 completes supplying powder, the print module 11 moves right to the upper side of the construction tank 13 simultaneously or later, and ejects and prints high viscosity liquid binder on the partial powder that is spread in the construction tank 13 using ink jet printing technology, so that the liquid binder and the powder are stuck together to become solidified. The print module 11 is controlled by the second transmission portion 18 for moving along the X direction and the Y direction, wherein the driving method of the print module 11 is commonly applied in general printing device and thus a detailed description is deemed unnecessary.

After completing the printing work, the print module 11 moves left to the original location, and the base plate 131 of the construction tank 13 controlled by the lifting portion also falls a predetermined height in the Z direction, so as to allow the powder supplying tank 12 to supply powder again for re-spreading a layer of powder on the completed-printing powder, and further proceed the next printing work. By repeating the above steps, the desired three-dimensional object, i.e. the three-dimensional physical model, is produced by stacking multiple layers.

Figure 1D:
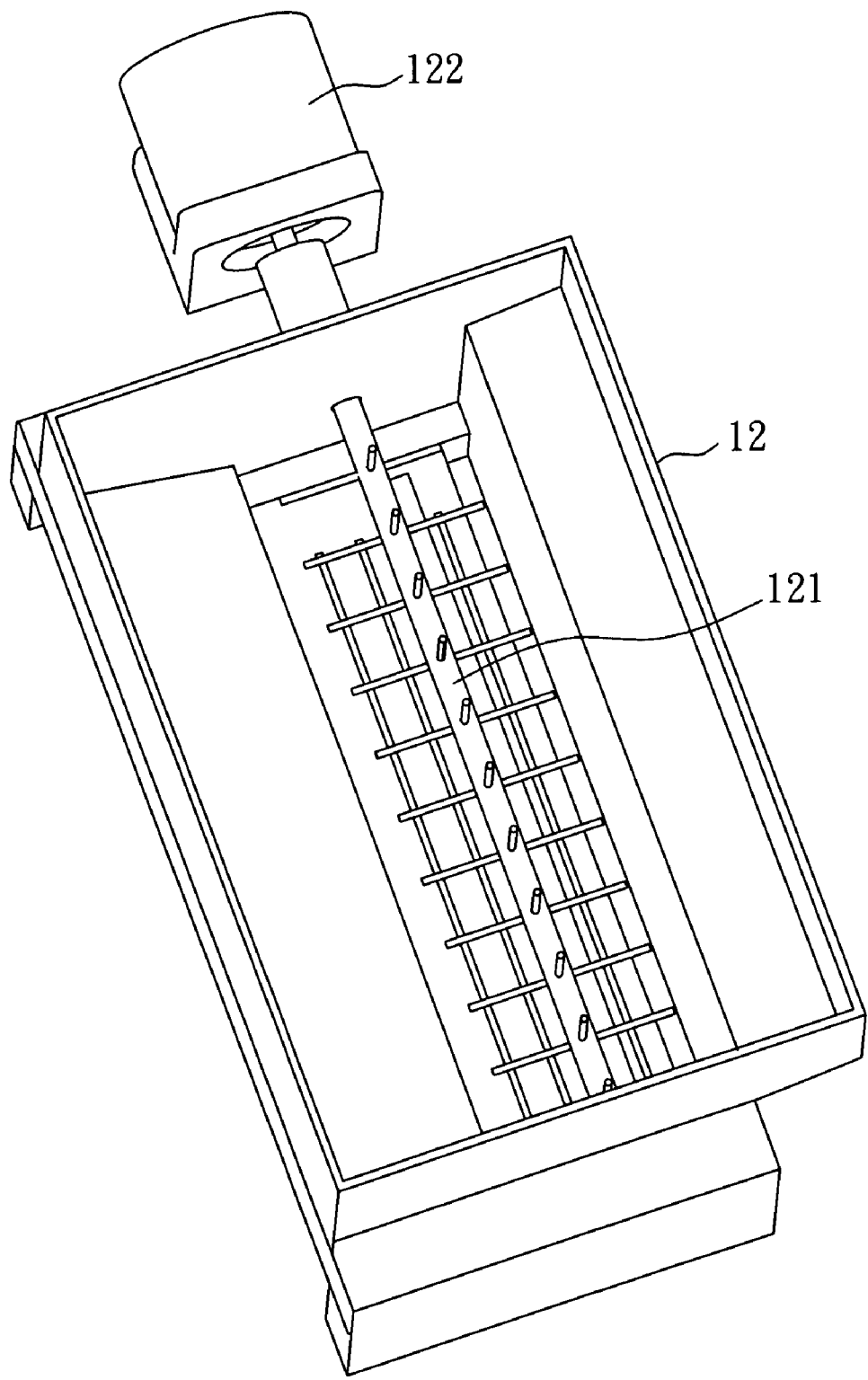
FIG. 1D is a structure diagram of the powder supplying tank with its cover opened.
Figure 1E:
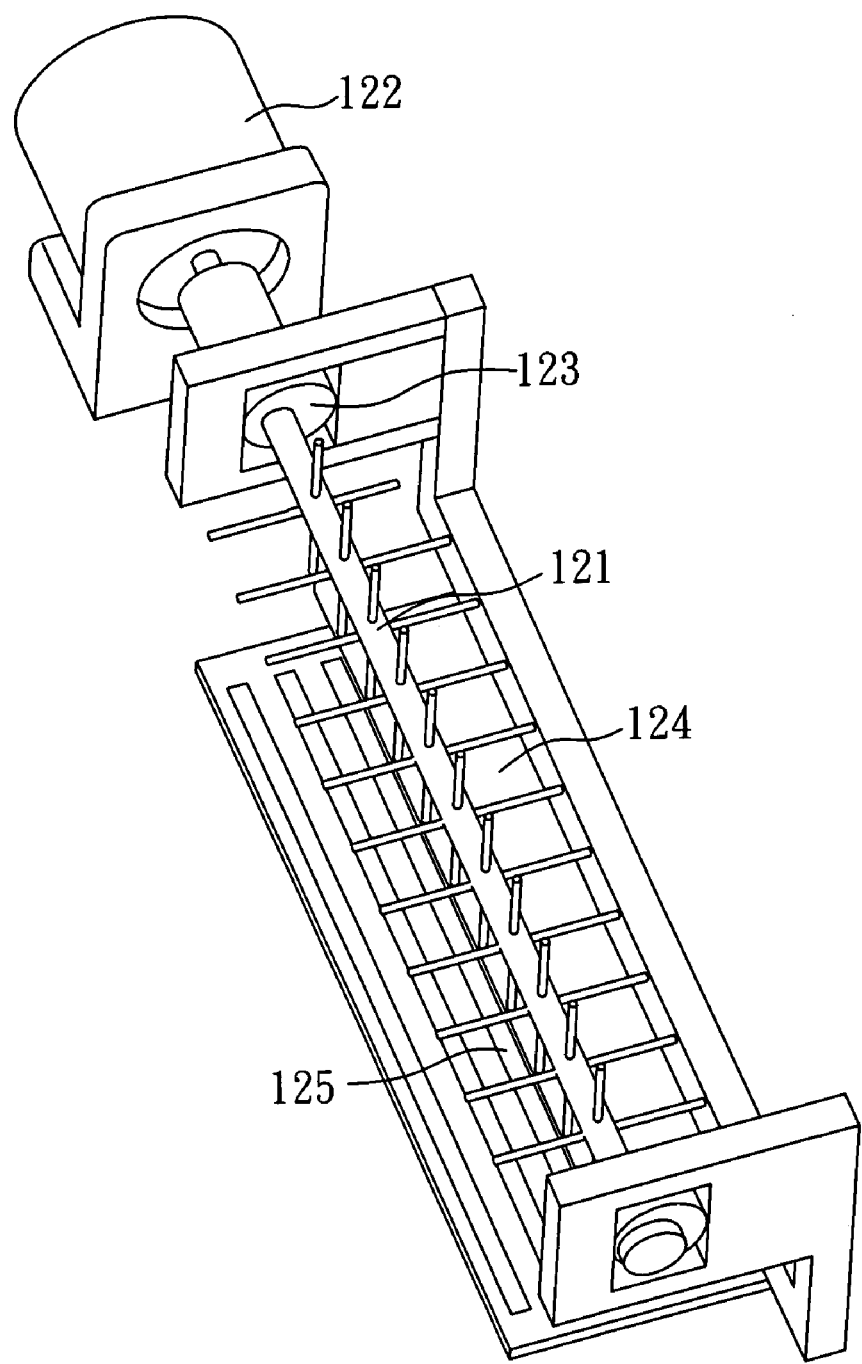
FIG. 1E is a partial structure diagram of FIG. 1D.
Figure 1F:
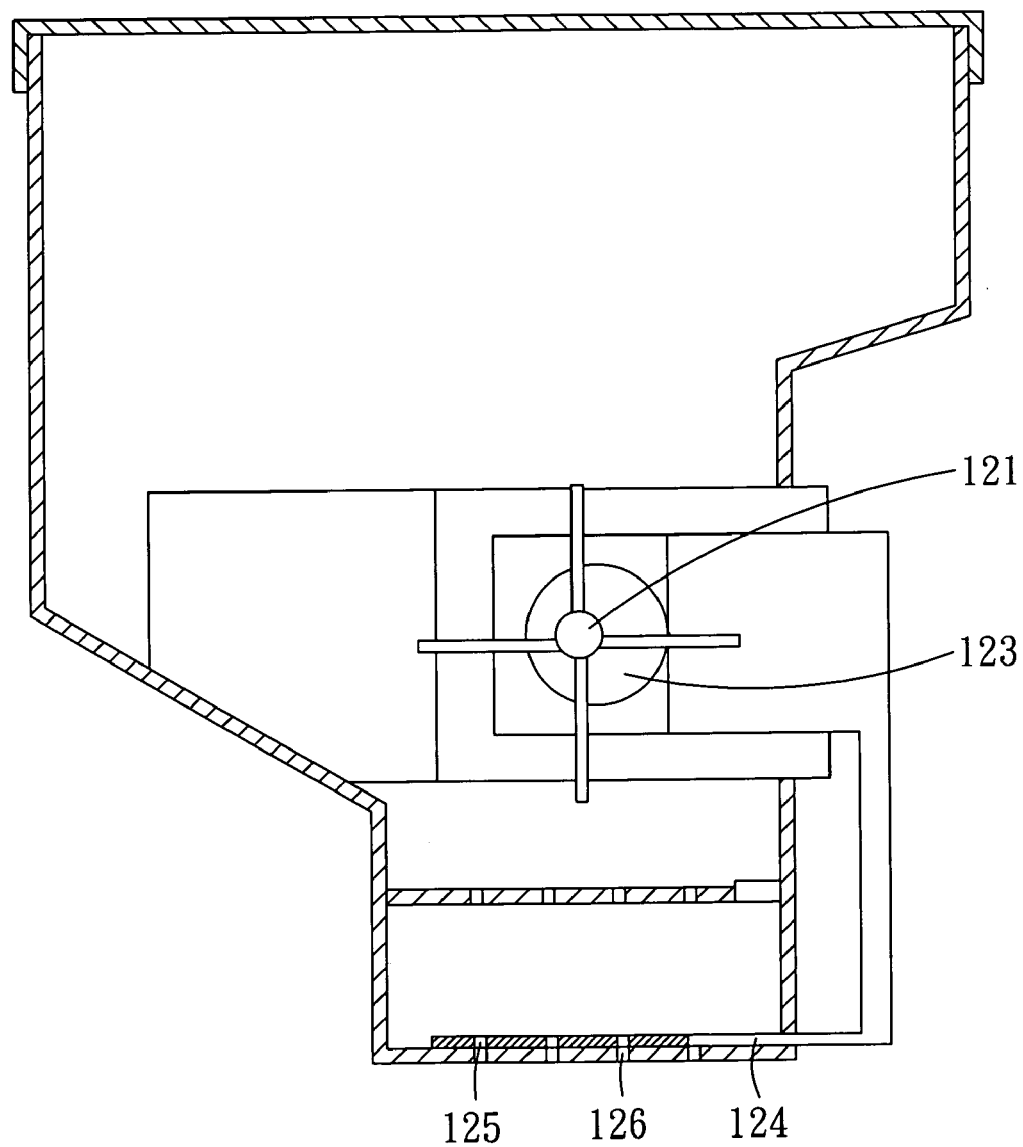
FIG. 1F is a structure diagram of the powder supplying tank while supplying powder.
Figure 1G:
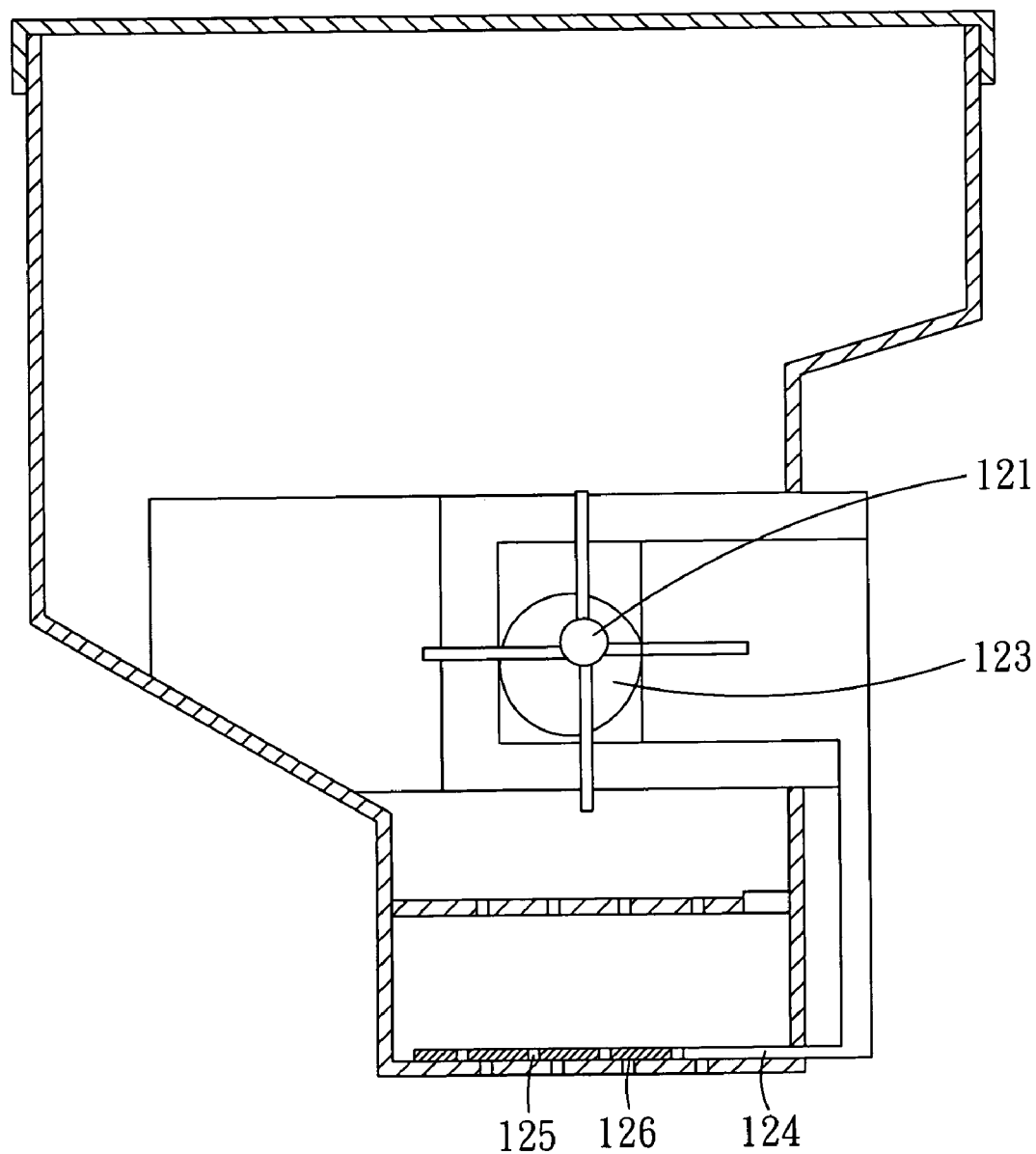
FIG. 1G is a structure diagram of the powder supplying tank while not supplying powder.

Please refer to FIGS. 1D-1G, wherein FIG. 1D is a structure diagram of the powder supplying tank with its cover plate opened, FIG. 1E is a partial structure diagram of FIG. 1D, FIG. 1F is a structure diagram of the powder supplying tank while supplying powder, and FIG. 1G is a structure diagram of the powder supplying tank, while not supplying powder. As shown in FIGS. 1D-1G, a stirring rod 121, set up inside the powder supplying tank 12, is driven by a motor 122 to stir the powder in the powder supplying tank 12 for distributing the powder uniformly in the powder supplying tank 12. The stirring rod 121 connected to an eccentric wheel 123 is used for driving the plate element 124 with multiple elongated slots 125 to move. Please refer to FIG. 1F and FIG. 1G at the same time, which are the cross-sectional views of the powder supplying tank 12. As shown in FIG. 1F and FIG. 1G, multiple holes 126 are set on the bottom of the powder supplying tank 12, and on the corresponding area of the plate element 124 of the powder supplying tank 12. Since the plate element 124 moves around with the eccentric wheel 123 rotating, the powder in the powder supplying tank 12 falls through the slots 125 and the holes 126 into the construction tank 13 when the slots 125 of the plate element 124 and the holes 126 on the bottom of the powder supplying tank 12 are aligned with each other (as shown in FIG. 1F). On the contrary, the powder cannot fall into the construction tank 13 when the slots 125 and the holes 126 are not aligned with each other (as shown in FIG. 1G). Thus, the amount of powder supplying into the construction tank 13 can be controlled, and powder leakage can also be prevented.

In addition, as shown in FIG. 1E, the slots 125 set on the plate element 124 are separated and parallel to each other, and the holes 126 set on the bottom of the powder supplying tank 12 are also separated and parallel to each other. Thus, powder can be supplied in batches into the construction tank 13, so as to average the density of the powder on the construction tank 13, thereby solving the problem that the density of the powder spread from front to rear is uneven and excess residual powder is pushed into the recycling rank 14 because of weight and pressure, which is caused by all of the powder being supplied at the beginning in the prior art.

Moreover, it takes time to wait for drying after each powder spreading and printing. In the prior art, it takes three minutes to wait after each powder spreading and printing, and the total time of forming is largely increased. Thus, in order to speed up the drying rate, a heating portion 17 is further included in the desk-top three-dimensional object forming apparatus 1 of the present invention (as shown in FIG. 1B), which is installed on the front end of the powder supplying tank 12 and provided for performing heating process on the powder after each printing, so as to speed up the sticking rate of the powder, thereby shortening the total forming time. In an embodiment, the heating portion 17 further includes a temperature sensor 171 for sensing the temperature of the heating portion 17 to control moderately.

Figure 2A:
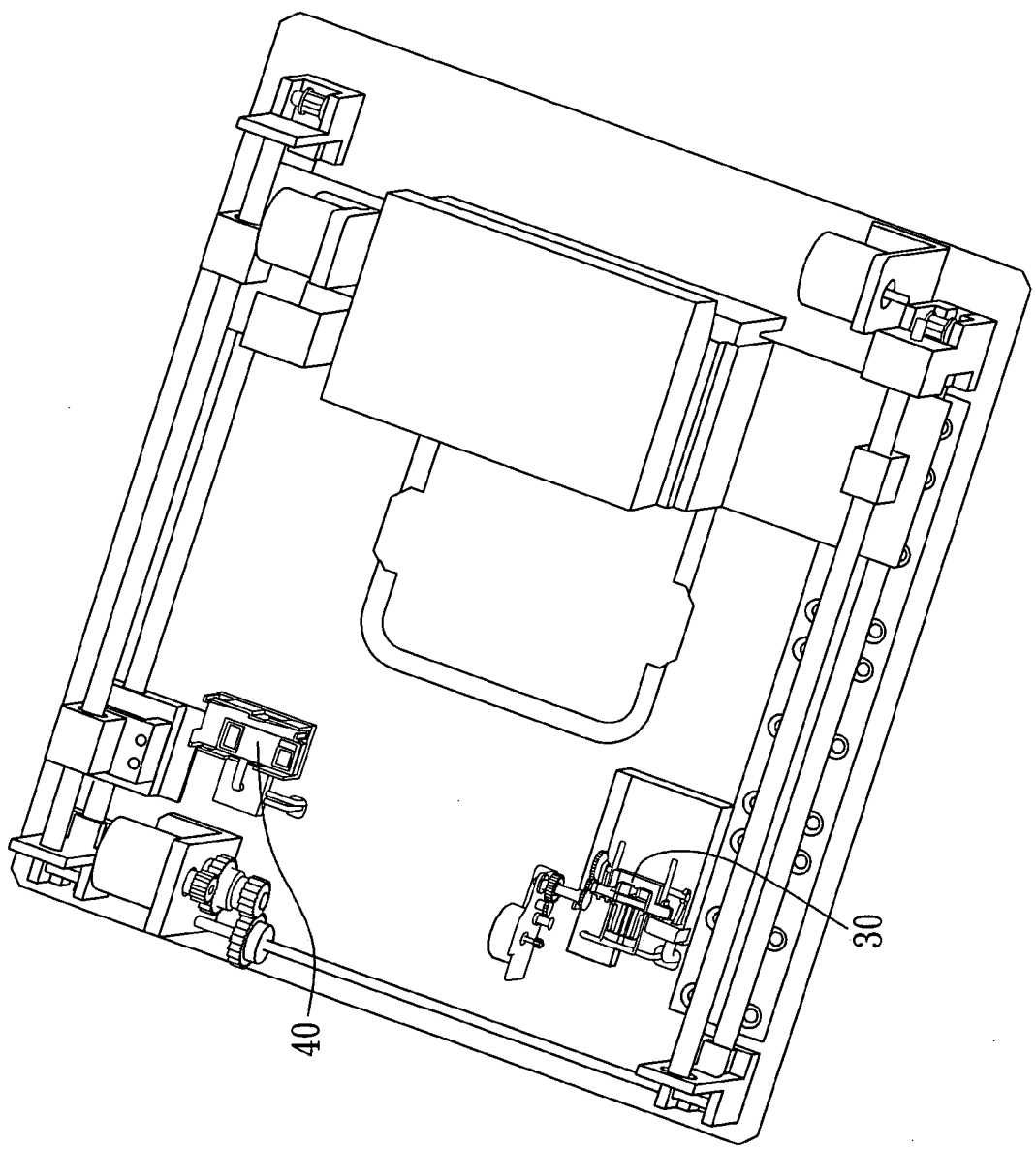
FIG. 2A is a partial structure diagram of the desk-top three-dimensional object forming apparatus according to the invention.

Please refer to FIG. 2A. FIG. 2A is a partial structure diagram of the desk-top three-dimensional object forming apparatus according to the invention, wherein the print module is removed to show the structure below the print module. As shown in FIG. 2A, the desk-top three-dimensional object forming apparatus 1 of the present invention further comprises a nozzle cleaning module 30 and a nozzle sealing module 40. In an embodiment, the nozzle cleaning module 30 and the nozzle sealing module 40 are installed in one side of the standby position of the print module 11 (such as the left side). The nozzle cleaning module 30 can clean up the residual binder and sticking powder on the nozzles after completing printing, and the nozzle sealing module 40 can provide a moist environment to prevent the nozzle from drying when sealing.

Figure 2B:
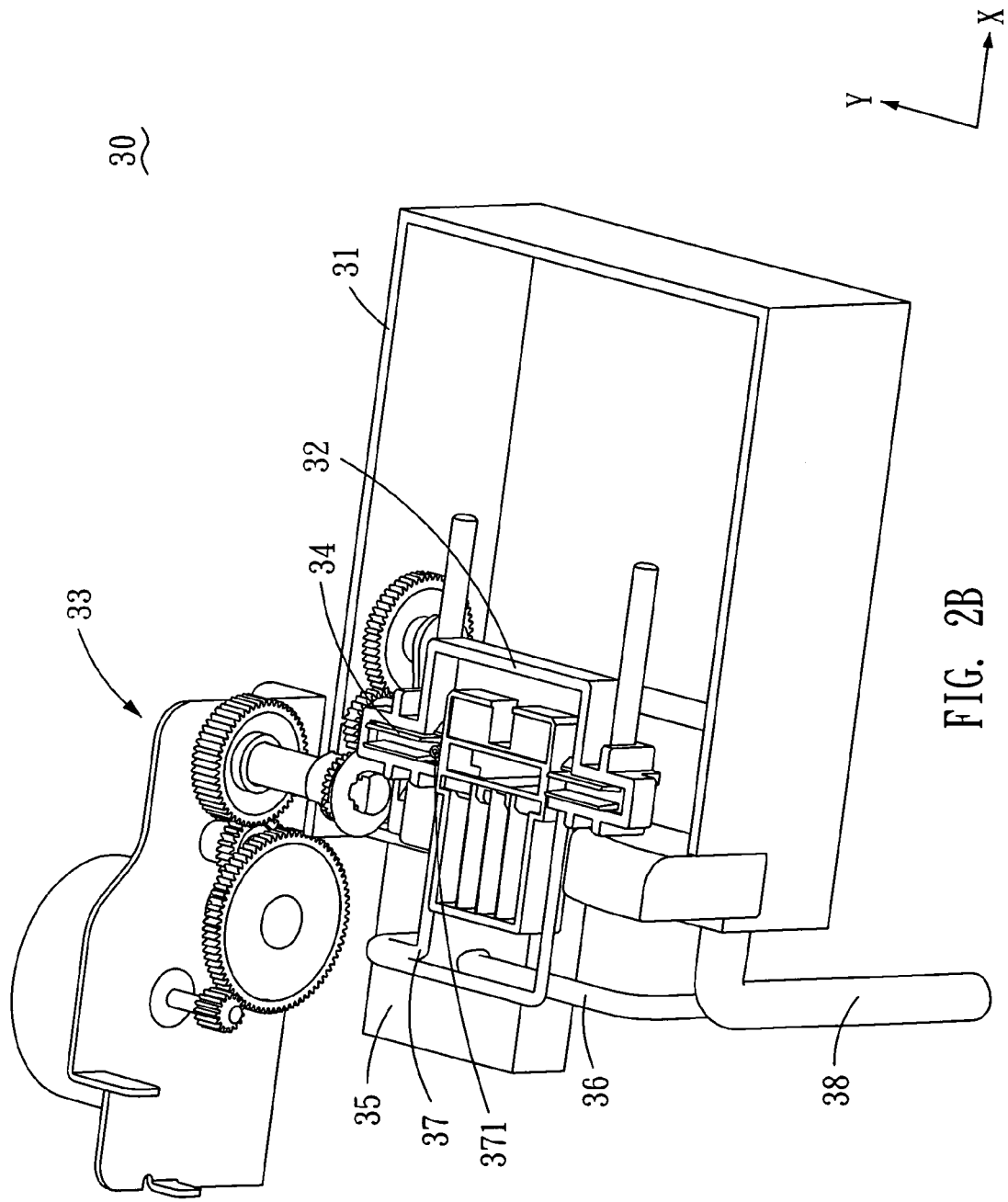
FIG. 2B is a structure diagram of the nozzle cleaning module according to the invention.

Please refer to FIG. 2B. FIG. 2B is a structure diagram of the nozzle cleaning module according to the invention. As shown in FIG. 2B, the nozzle cleaning module 30 includes a box body 31, a base 32, a driving device 33 and at least a wiper 34. The base 32 is located in the box body 31 and can be driven to reciprocate along the X direction by the driving device 33. The wiper 34 is extended from the surface of the base 32 and installed corresponding to the print cartridge. For example, if the print module 11 has two sets of print cartridges, the nozzle cleaning module 30 could have two wipers 34 installed corresponding to the two print cartridge sets, and each print cartridge set has, but not limited to, the two wipers 34 parallel to each other, and the wipers 34 can be made by rubber material. The print cartridge is moved to the upper side of the nozzle cleaning module 30 when the nozzles complete printing, the nozzles are corresponding to the locations of the wipers 34 and being touched to the wipers 34, and the driving device 33 drives the base 32 to reciprocate along the X direction simultaneously, so as to make the wipers 34 move on the surface of the nozzles to scrape the residual binder and sticking powder.

In addition, since binder and powder are easily stuck on the nozzles and hard to scrape entirely, the nozzle cleaning module 30 of the present invention further comprises a spray portion, which includes a liquid storage tank 35, a pumping pipe 36, a spray pipe 37 and a waste pipe 38. The liquid storage tank 35 is installed next to the box body 31. Liquid is delivered from the liquid supply unit (not shown), which is installed under the base platform 10 in FIG. 1A, to the liquid storage tank 35 through the pumping pipe 36, and is sprayed to the nozzles by using the spray pipes 37, wherein the spray apertures 371 of the spray pipe 37 is installed contiguous to the wipers 34. The number of the spray apertures 371 is preferably the same as the number of the wipers 34, for example, the nozzle cleaning module 30 has two sets of wipers 34 and two spray apertures 371 when the print module 11 has two print cartridges.

Therefore, the nozzle cleaning module 30 sprays a little liquid to the nozzles when the nozzles complete printing and move to the upper side of the nozzle cleaning module 30. The liquid can be, but not limited to, water, cleaner or solvent for moistening the binder and powder on the nozzles, so as to facilitate the wipers 34 in cleaning the nozzles. Thus, the residual binder and sticking powder on the nozzles can be easily scraped when the driving device 33 drives the wipers 34 to move on the surface of the nozzles.

Besides, the liquid sprayed from the spray apertures 371, the waste liquid and waste residue scraped by the wipers 34 flow into the box body 31, and flow into the waste liquid unit (which is installed under the base platform 10 in FIG. 1A, but not shown in figures) through the waste pipe 38 connected to the box body 31, to proceed waste liquid treatment.

On the other hand, the aforementioned nozzle cleaning module 30 can be applied not only in the three-dimensional object forming apparatus 1, but also in a general two-dimensional printer. For example, the conventional printer can be improved to spray a little liquid to the nozzles before cleaning the nozzles by the wiper 34 based on the present invention. In this way, moistening the nozzles by ink or high-volatile ink can facilitate the cleaning process.

Figure 2C:
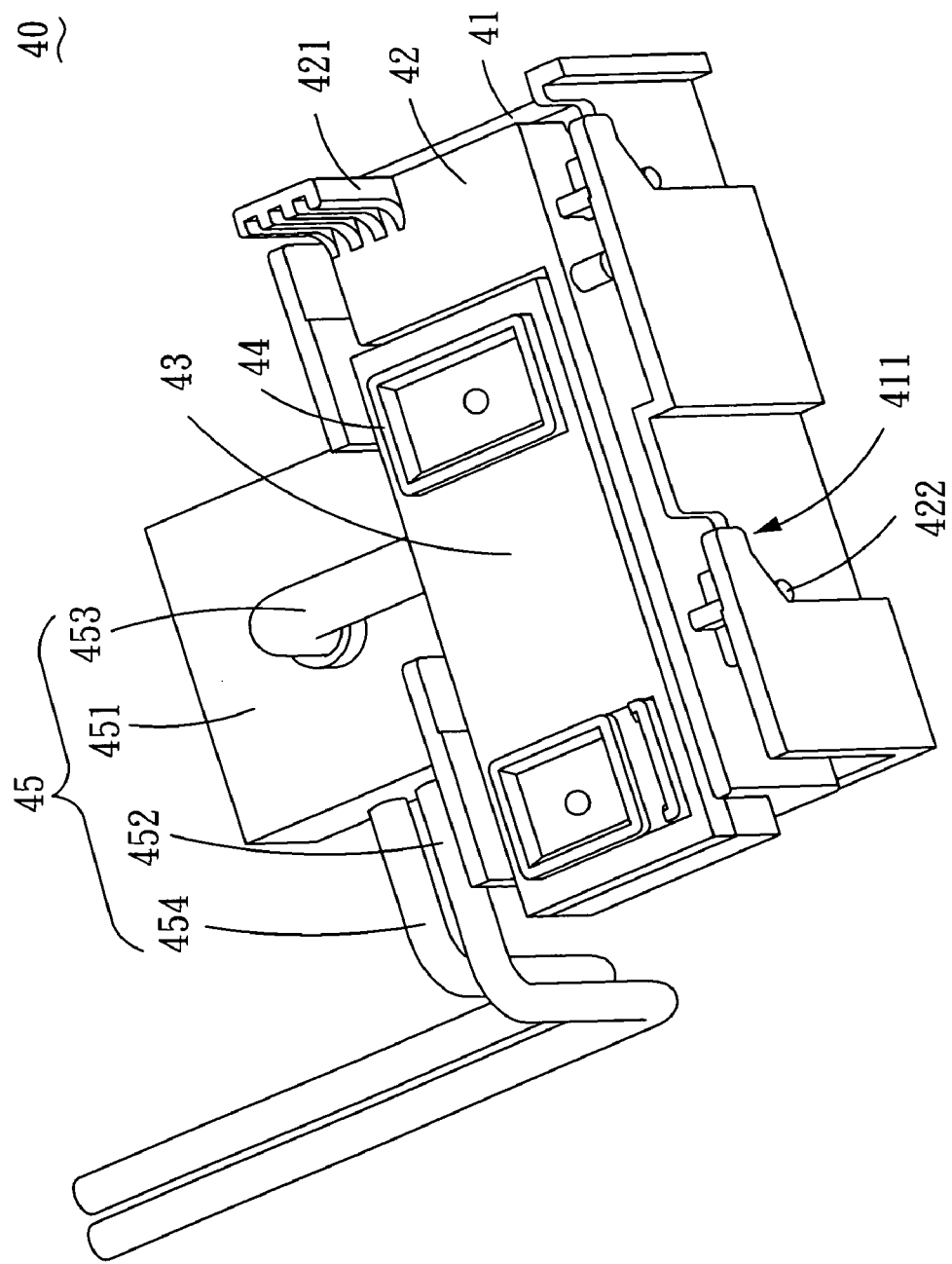
FIG. 2C is a structure diagram of the nozzle sealing module according to the invention.
Figure 2D:
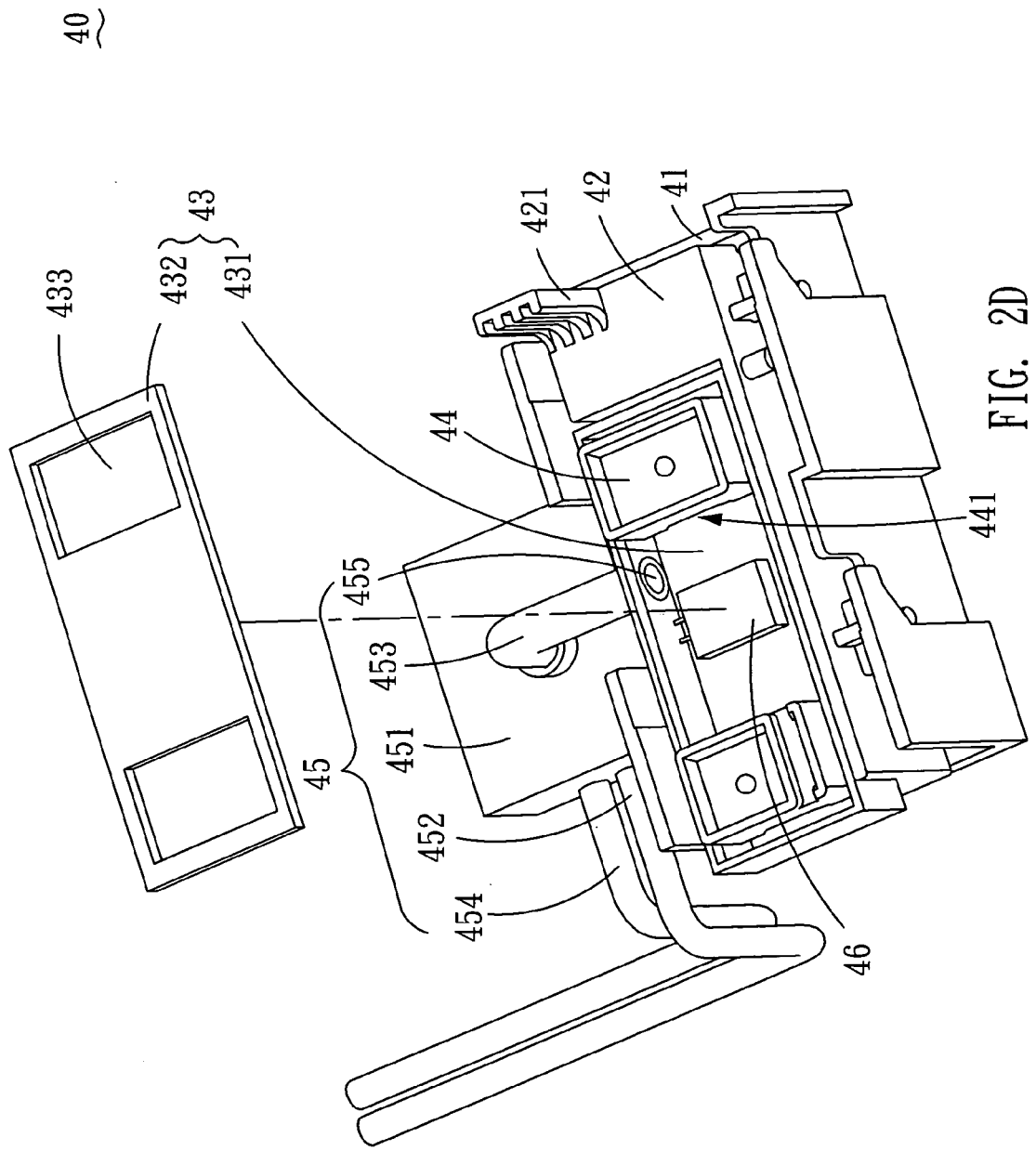
FIG. 2D is an exploded view of FIG. 2C with the cover plate separated.

Please refer to FIG. 2C and FIG. 2D. FIG. 2C is a structure diagram of the nozzle sealing module according to the invention, and FIG. 2D is an exploded view of FIG. 2C with the cover separated. As shown in FIG. 2C and FIG. 2D, the nozzle sealing module 40 includes a base 41, a slide seat 42, a holder 43, a sealing portion 44, a moisture portion 45 and a humidity sensor 46, wherein the slide seat 42 is installed on the base 41, and the sealing portion 44 is installed on the holder 43. The holder 43 is composed of a tank body 431 and a cover plate 432. The sealing portion 44 is located in the tank body 431 of the holder 43 and protrudes out the top surface of the holder 43 partially. The cover plate 432 of the holder 43 has an opening 433 corresponding to the sealing portion 44 so that the sealing portion 44 can go through the opening 433, and then protrude out the top surface of the holder 43. The sealing portion 44 is used for covering the nozzles of the print cartridges to maintain the humidity of the nozzles, so as to prevent binder from drying to block the apertures of the nozzles. The shape and the location of the sealing portion 44 are set corresponding to the nozzles of the print cartridges, hence the number of the sealing portion 44 is dependent on the number of the print cartridges, but not limited as two in this embodiment.

Figure 2E:
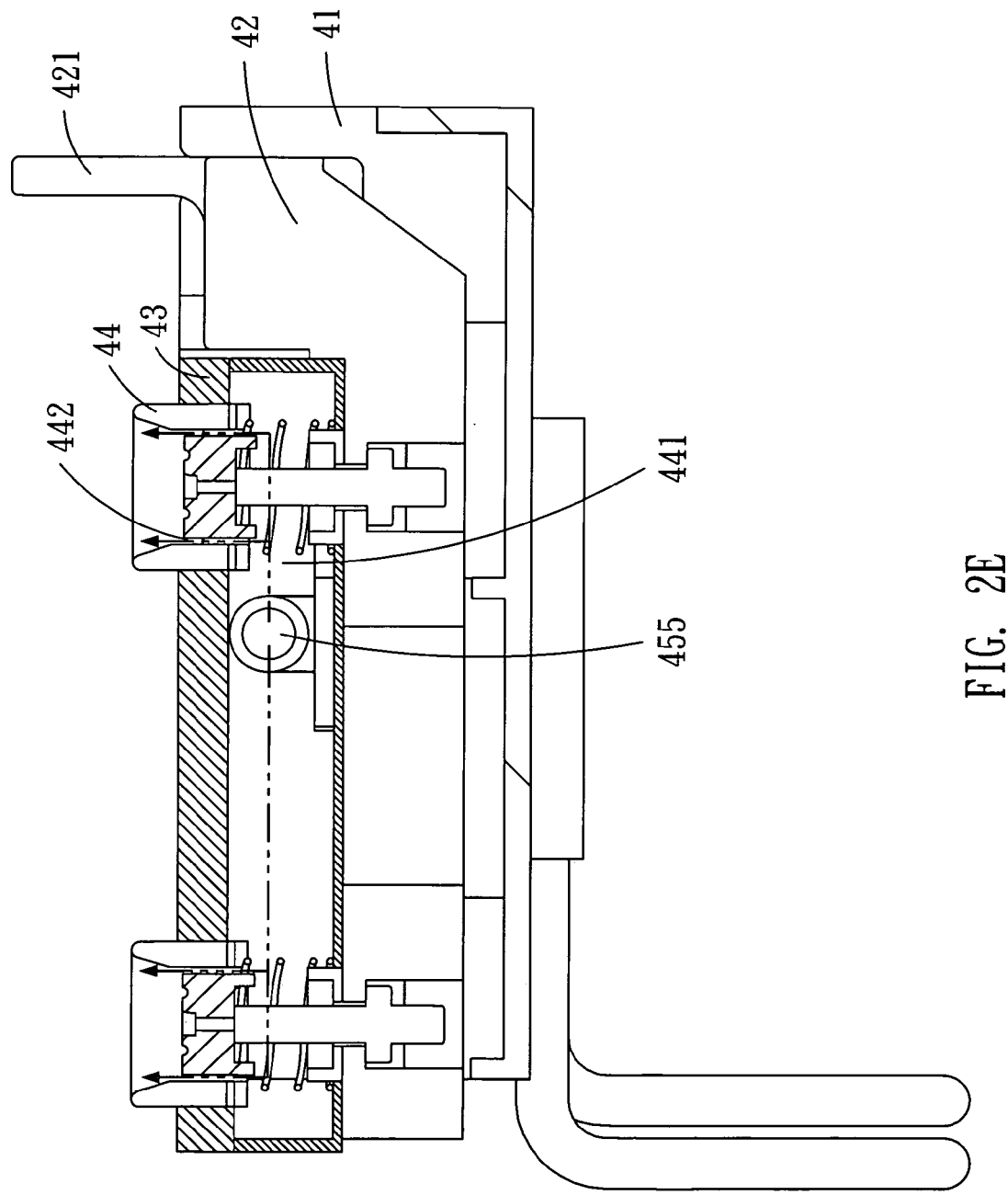
FIG. 2E is a partial cross-sectional view of the nozzle sealing module according to the invention.

To ensure the moisture condition of the nozzles covered by the sealing portions 44, the nozzle sealing module 40 of the present invention further comprises the moisture portion 45, which includes a water storage tank 451, a water pumping pipe 452, a spray pipe 453 and a water collection pipe 454. The water storage tank 451 is installed next to the base 41. Water is delivered from the water supply unit (not shown), which is installed under the base platform 10 in FIG. 1A, to the water storage tank 451 through the water pumping pipe 452. The water storage tank 451 further includes an atomizer (not shown) for atomizing water and spraying mist into the tank body 431 of the holder 43 through the spray aperture 455 by using the spray pipe 453. The side of the sealing portion 44 has a slot 441, which is used for mist to enter into the sealing portion 44 and disperse from the seams 442 on two sides (as shown by the arrows in FIG. 2E, wherein FIG. 2E is a partial cross-sectional view of the nozzle sealing module according to the invention), to maintain the nozzles moist. The water collection pipe 454 connects to the water storage tank 451 and a water collection unit (not shown), which is installed under the base platform 10 in FIG. 1A, to collect water for recycling.

Besides, the nozzle sealing module 40 further includes the humidity sensor 46, which is installed in the tank body 431 of the holder 43, for starting the moisture portion 45 to spray when sensing that the humidity inside the holder 43 is insufficient, so as to maintain the humidity inside the holder 43 exceeding 80%, thereby preventing the nozzles form drying, and thus increasing the useful lifetime of the nozzles.

Figure 2F:
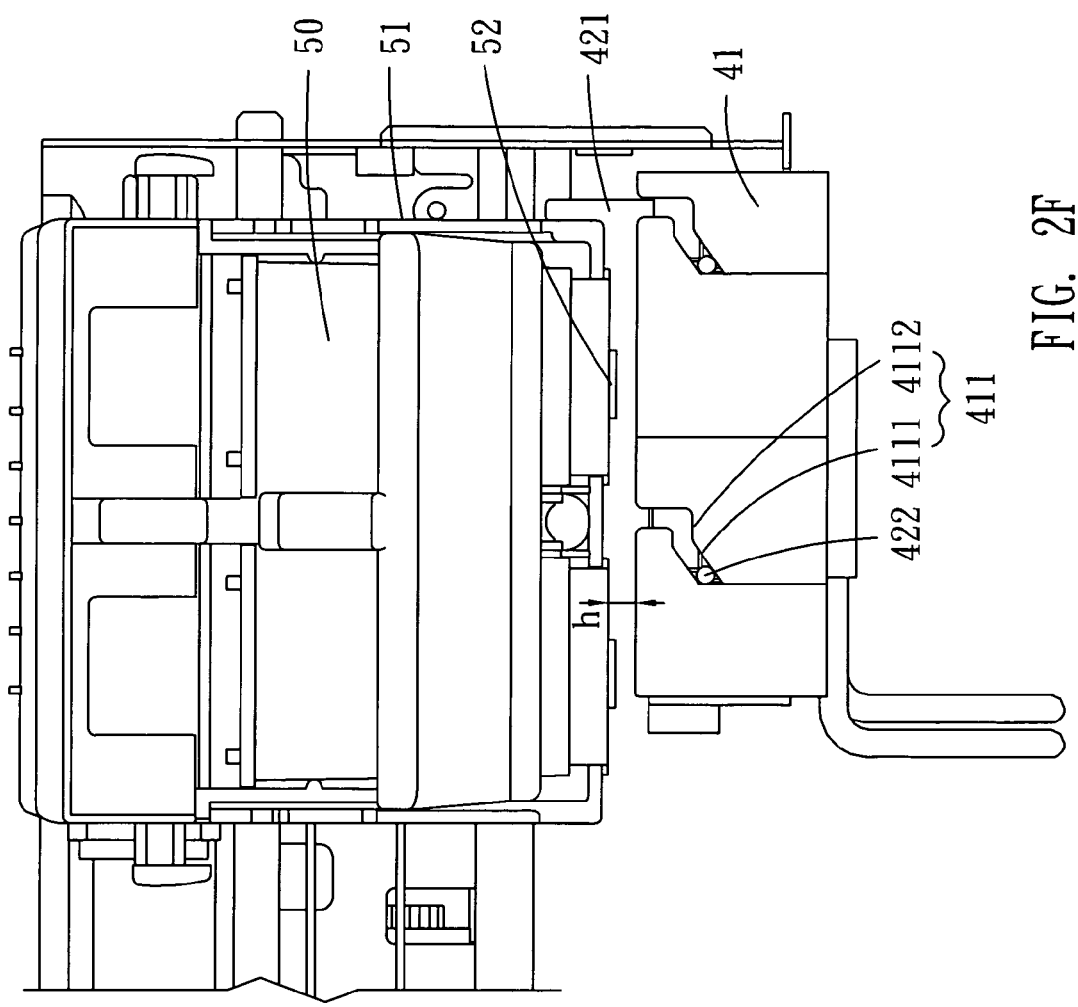
FIGS. 2F-2G are process diagrams of the nozzle sealing module during covering the nozzles.
Figure 2G:
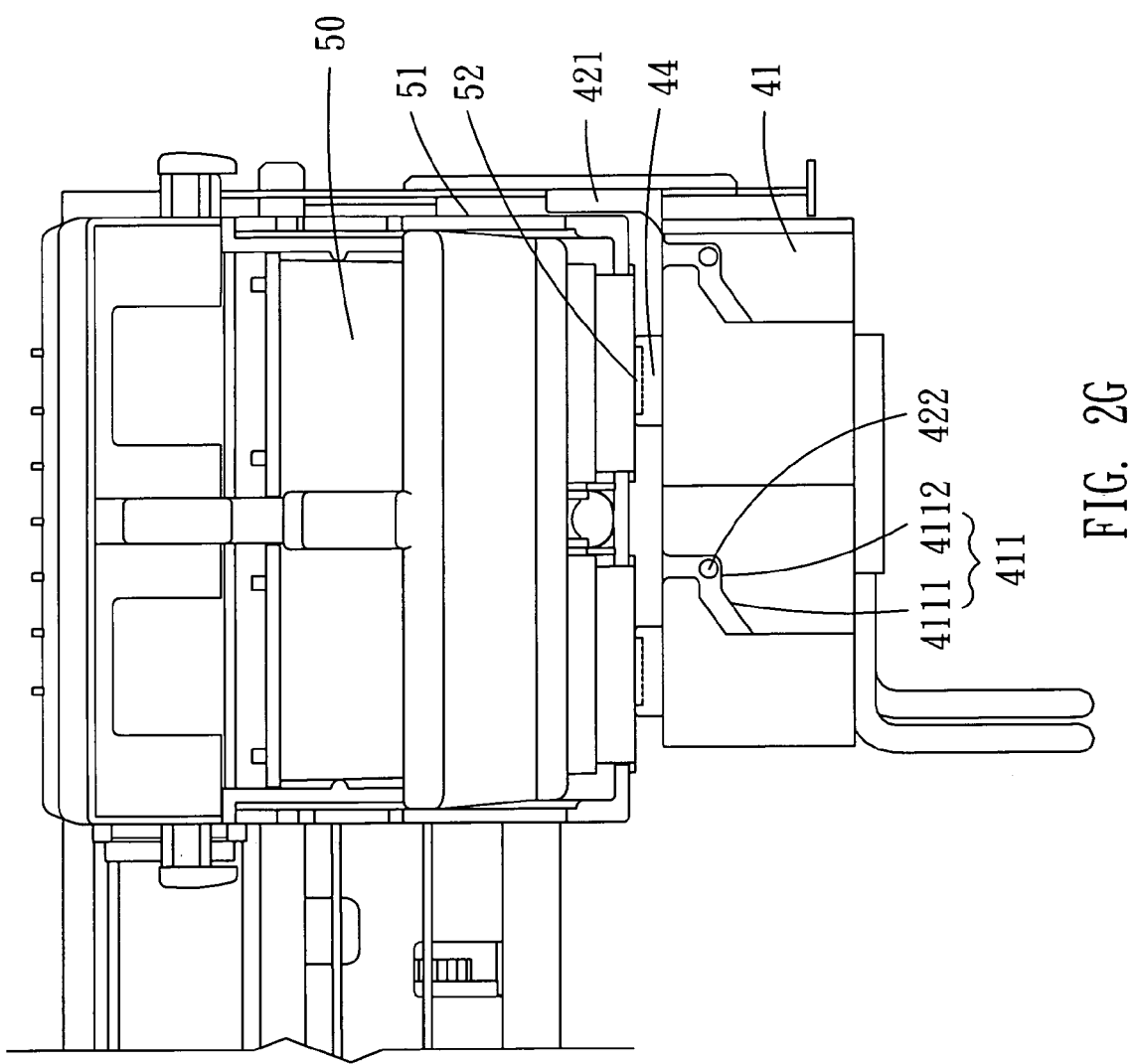

Please refer to FIG. 2C, FIG. 2F and FIG. 2G. FIGS. 2F-2G are process diagrams of the nozzle sealing module during covering the nozzles. As shown in FIG. 2C, the slide seat 42 has a block part 421 and at least a pin 422. The block part 421 is extended from the surface of the slide seat 42. The pin 422 is protruded out from the side of the slide seat 42 and installed in the path guide 411 of the side of the base 41. The path guide 411 is composed of an inclined plane 4111 and a plane 4112 connected to the inclined plane 4111 (as shown in FIG. 2F).

The frame board 51 of the print cartridge 50 moves back to the upper side of the nozzle sealing module 40 when the print module 11 completes printing. In the moving back process, the frame board 51 of the print cartridge 50 first touches the block part 421 of the slide seat 42. At this time, the distance between the bottom of the print cartridge 50 and the sealing portion 44 is h (as shown in FIG. 2F). Next, the frame board 51 of the print cartridge 50 moves forward to touch the block part 421 of the slide seat 42 and makes the pin 422 in the side of the slide seat 42 move along the path guide 411 and slide to the plane 4112 along the inclined plane 4111. Thus, the height of the holder 43 and the sealing portion 44 can rise with the slide seat 42 moving, and the sealing portion 44 covers on the nozzles 52 of the print cartridges 50 (as shown in FIG. 2G). Therefore, the nozzles 52 can be sealed in the sealing portion 44 and the humidity of the nozzles 52 can be maintained by using the moisture portion 45 to spray for preventing the nozzles 52 from drying, thereby increasing the useful lifetime of the nozzles 52.

From above, the desk-top three-dimensional object forming apparatus 1 of the present invention has the nozzle cleaning module 30 and the nozzle sealing module 40. The desk-top three-dimensional object forming apparatus 1 cleans the nozzles 52 thoroughly by the spray portion and the wipers 34 of the nozzle cleaning module 30 when the nozzles 52 completes printing, and further seals the nozzles 52 in the nozzle sealing module 40 with humidity controlling function. Thus, the entirely dustproof and anti-dry effect of the nozzles 52 is achieved.

Certainly, the nozzle sealing module 40 of the present invention can be applied not only in the three-dimensional object forming apparatus 1, but also in a general two-dimensional printer. Namely, based on the present invention, the conventional nozzle sealing module can be improved to add the moisture portion to ensure the humidity of the nozzles 52.

On the other hand, the desk-top three-dimensional object forming apparatus 1 of the present invention further comprises the detachable construction tank 13, to remove the construction tank 13 and the formed three-dimensional object in the construction tank 13, and proceed sieving and taking out in other place. In the way, the problem of the working environment polluted by the flying powder in the prior art can be solved. The design of the detachable construction tank 13 of the present invention is described in the following.

Please refer to FIG. 3A. FIG. 3A is a partial structure diagram of the desk-top three-dimensional object forming apparatus according to the invention. As shown in FIG. 3A, the bottom of the construction tank 13 is fixed on the lifting portion 60. The lifting portion 60 drives the lifting platform 61 and the base plate 131 fixed on the lifting platform 61 to fall inside the construction tank 13 (as shown in FIG. 1C) after each of the print module 11 prints one layer or produces a fixed thickness. The print module 11 continues to cooperate with the powder supplying tank 12 to proceed the production of the three-dimensional object until the whole three-dimensional object is formed.

Figure 3B:
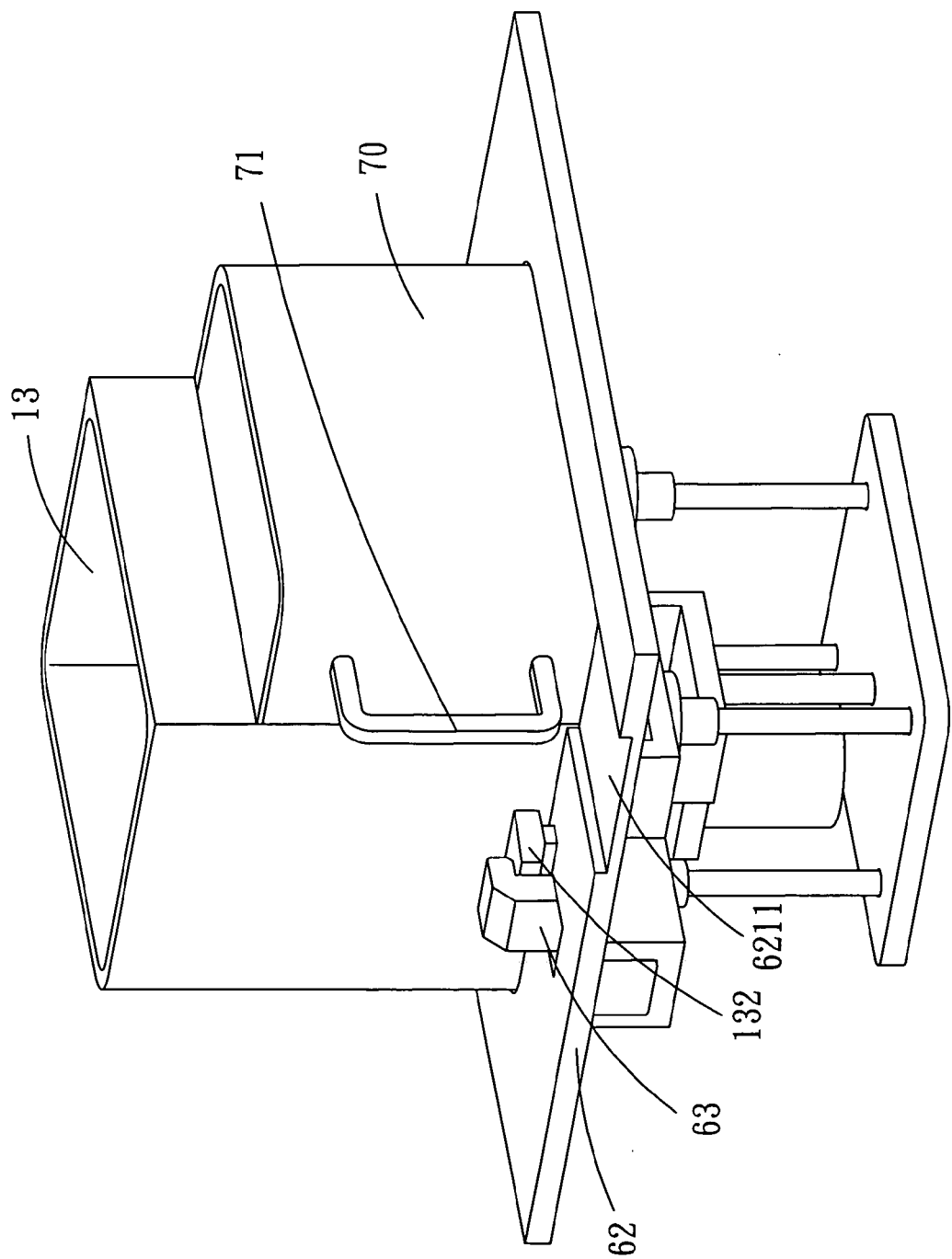
FIG. 3B is a structure diagram of the construction tank and the lifting portion according to the invention.

Please refer to FIG. 3A and FIG. 3B. FIG. 3B is a structure diagram of the construction tank and the lifting portion according to the invention. As shown in FIG. 3A and FIG. 3B, the bottom of the construction tank 13 has convex fasteners 132 on the two sides in the Y direction respectively. The lifting portion 60 has a loading platform 62 for loading the tank body 130 of the construction tank 13 and the waste powder recycling unit 70, and buckle parts 63, which is upwardly protruded out the loading platform 62 and installed corresponding the convex fasteners 132, for buckling to each other to fix the tank body 130 of the construction tank 13 on the loading platform 62. In addition, the waste powder recycling unit 70 set in the side of the construction tank 13 is installed under the recycling tank 14 on the base platform 10 for collecting the waste powder falling from the recycling tank 14, and the waste powder recycling unit 70 further includes a handle 71 for conveniently taking the waste powder recycling unit 70 out along the guide groove 6211 of the loading platform 62 so as to proceed the waste powder recycling treatment.

Figure 3C:
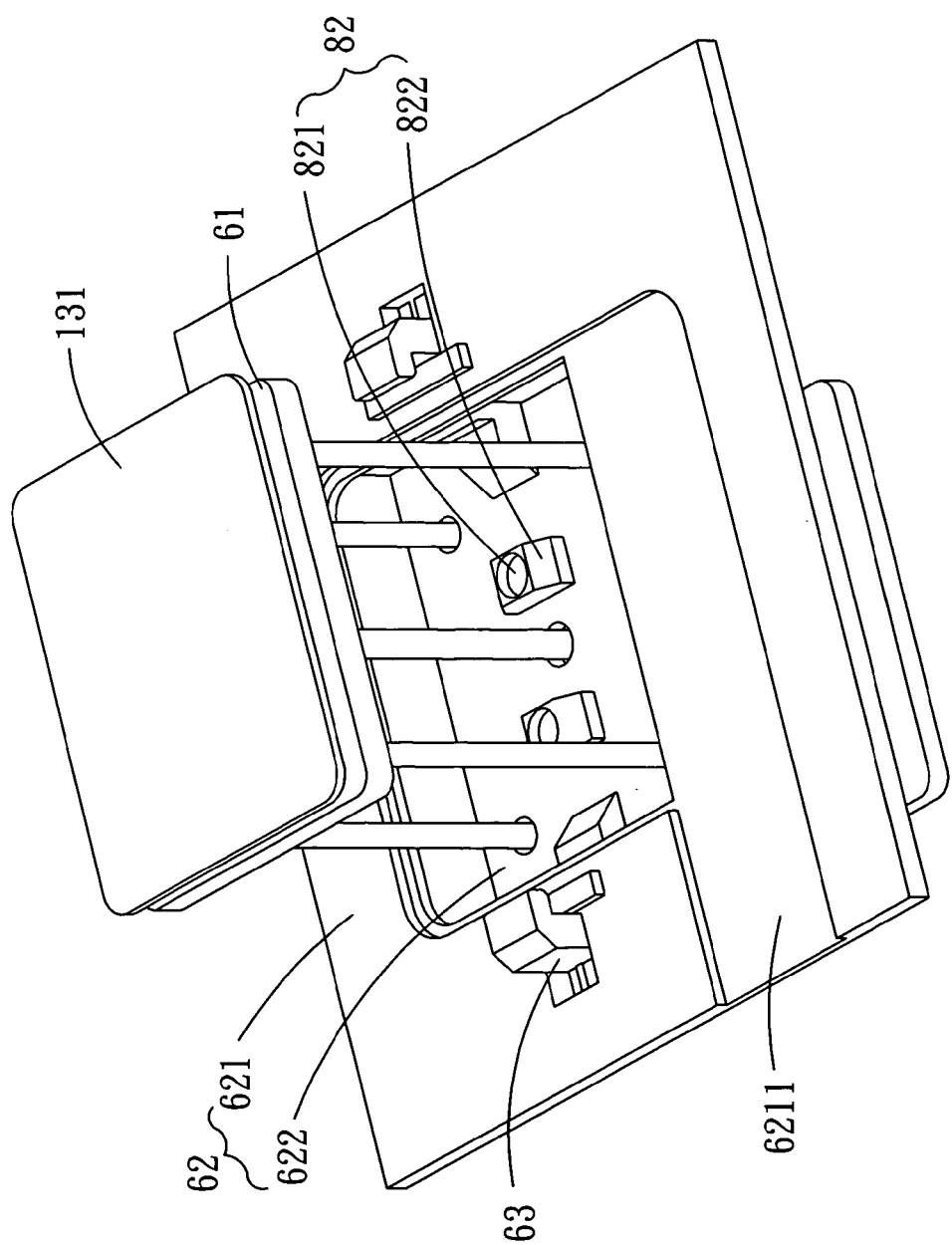
FIG. 3C is a structure diagram of the loading platform of the lifting portion according to the invention.
Figure 3D:
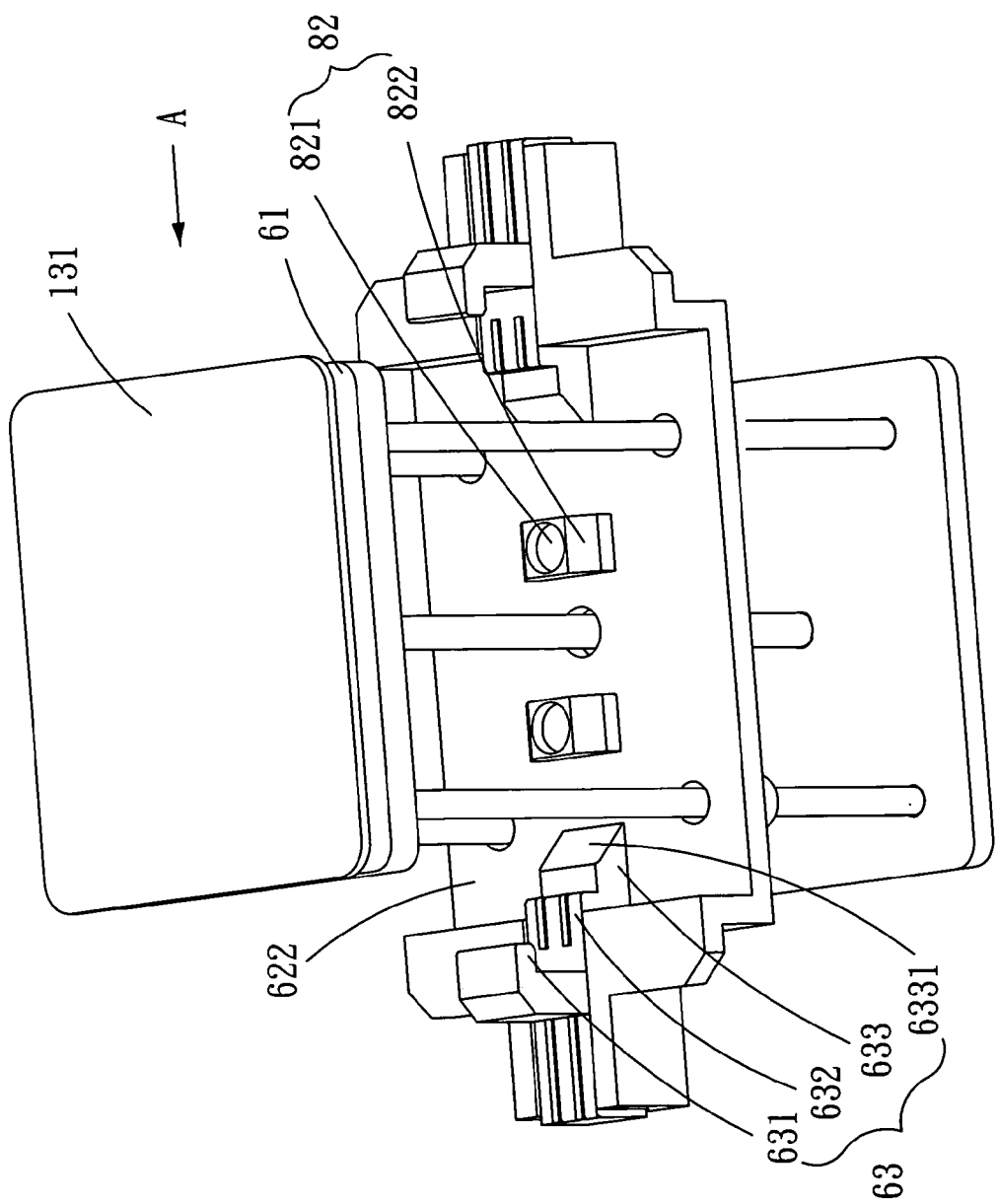
FIG. 3D is a partial structure diagram of FIG. 3D.

Please refer to FIG. 3C and FIG. 3D. FIG. 3C is a structure diagram of the loading platform of the lifting portion according to the invention, and FIG. 3D is a partial structure diagram of FIG. 3D. As shown in FIG. 3C and FIG. 3D, the loading platform 62 of the lifting portion 60 comprises an upper plate element 621 and a lower plate element 622, and FIG. 3D schematically illustrates removal of the upper plate element 621. The buckle part 63 includes a hooking part 631, a buckling slide seat 632 and a buckling slide block 633. The hooking part 631, which has a substantially reverse-L shape and is protruded out the upper plate element 621 of the loading platform 62, is provided for buckling on the convex fasteners 132 of the construction tank 13. The buckling slide seat 632 connected to the lower side of the hooking part 631 is installed on the lower plate element 622 of the loading platform 62 and has elastic element inside, for example, but not limited to, springs (shown as 6321 in FIG. 3E), and the buckling slide block 633 with an inclined plane 6331 is installed in the front edge of the center of the buckling slide seat 632 forwarding to the lower plate element 622.

Figure 3E:
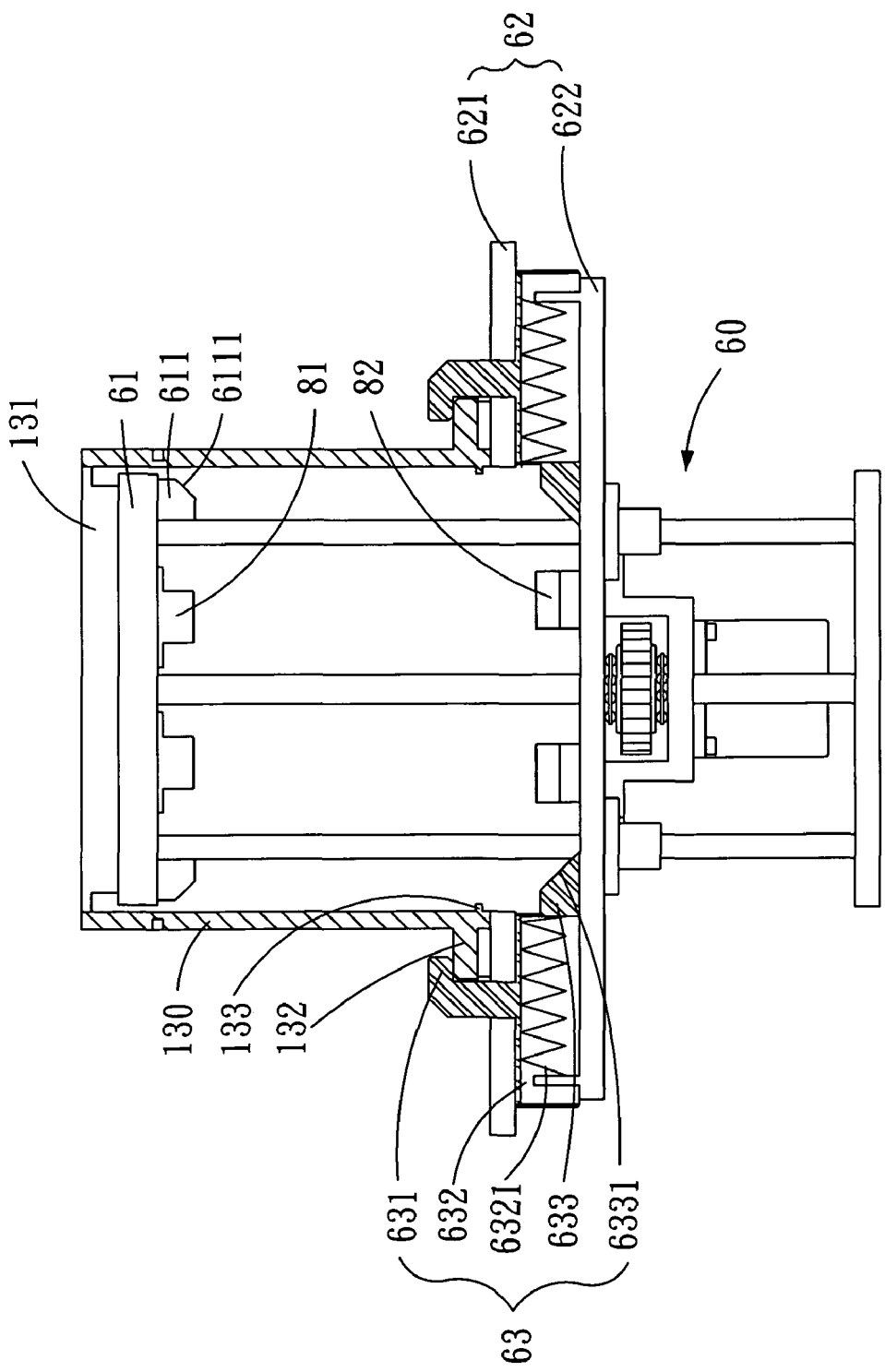
FIG. 3E is a structure diagram of the construction tank and the buckle part while buckling to each other.
Figure 3F:
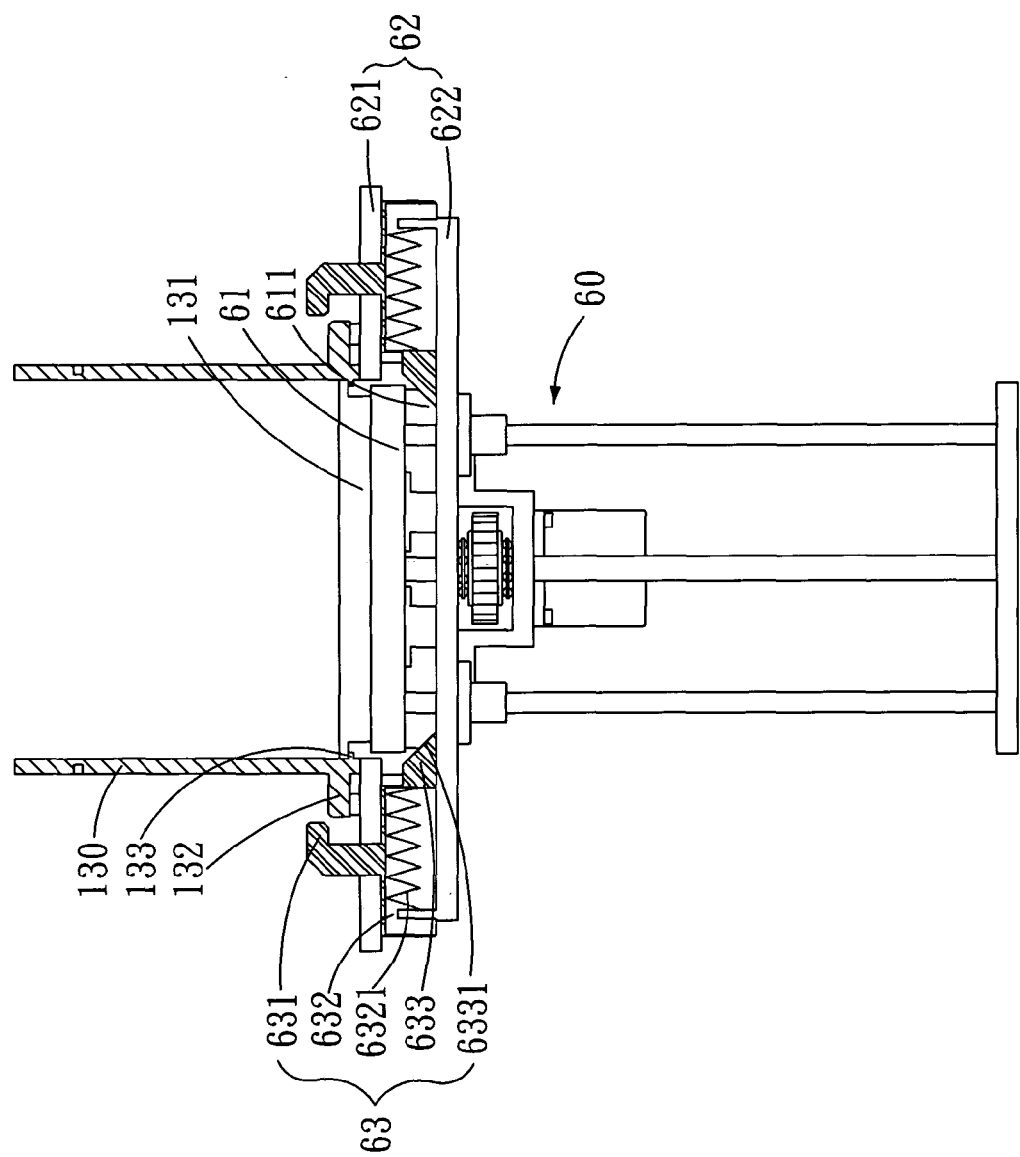
FIG. 3F is a structure diagram of the construction tank and the buckle part while separating.

Please refer to FIGS. 3C-3D and FIGS. 3E-3F. FIG. 3E is a structure diagram of the construction tank and the buckle part while buckling to each other. FIG. 3F is a structure diagram of the construction tank and the buckle part while separating. As shown in figures, the lifting portion 60 drives the lifting platform 61 and the base plate 131 fixed on the lifting platform 61 to fall inside the construction tank 13 during the process of forming the three-dimensional objects. The convex fasteners 132 of the construction tank 13 and the hooking parts 131 on the loading platform 62 of the lifting portion 60 are buckled to each other during the forming process, so as to fix the construction tank 13 on the loading platform 62 (as shown in FIG. 3E). The base plate 131 of the construction tank 13 and the lifting platform 61 fall to the bottom of the construction tank 13 when the three-dimensional object is formed. Since the bottom side of the lifting platform 61 has two convex blocks 611 with inclined planes 6111, the inclined planes 6111 of the convex blocks 611 are corresponding to the inclined planes 6331 of the buckling slide block 633. The convex block 611 touches the buckling slide block 633 of the buckle part 63 when the lifting platform 61 falls to the bottom of the construction tank 13, and pushes the buckle part 63 out by using the traction between the inclined plane 6111 of the convex block 611 and the inclined plane 6331 of the buckling slide block 633 and the elastic deformation of the spring 6321. The convex fasteners 132 of the construction tank 13 and the hooking part 631 are separated, and the construction tank 13 can be disassembled from the three-dimensional object forming apparatus 1.

Besides, before disassembling the construction tank 13, the base plate 131 fixed on the lifting platform 61 is also separated from the lifting platform 61. The way of fixing and separating the base plate 131 and the lifting platform 61 is described in the following.

Figure 3G:
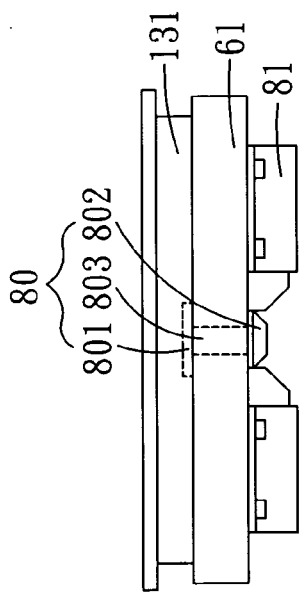
FIG. 3G is a side view of the base plate and the lifting platform in FIG. 3D observing from the direction A.
Figure 3H:
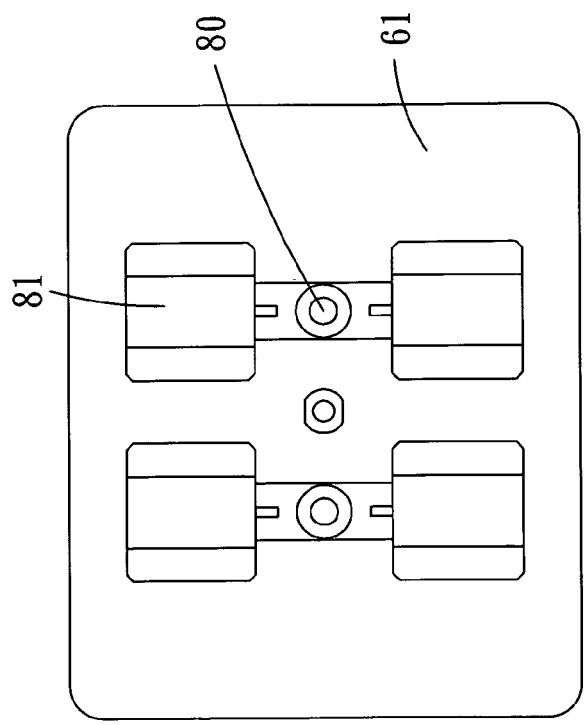
FIG. 3H is a bottom view of the lifting platform in FIG. 3D.

Please refer to FIGS. 3G-3H. FIG. 3G is a side view of the base plate and the lifting platform in FIG. 3D observing from the direction A, and FIG. 3H is a bottom view of the lifting platform in FIG. 3D. As shown in figures, the base plate 131 has convex portions 80, the lifting platform 61 has an engaging carriage in the bottom, which is composed of two engaging slide seats 81 installed corresponding to each other, and the convex portions 80 can engage in the engaging carriage to fix the base plate 131 on the lifting platform 61. In one embodiment, the base plate 131 of the present invention has two convex portions 80, and the lifting platform 61 has, but not limited to, two engaging carriages in the bottom.

Figure 3I:
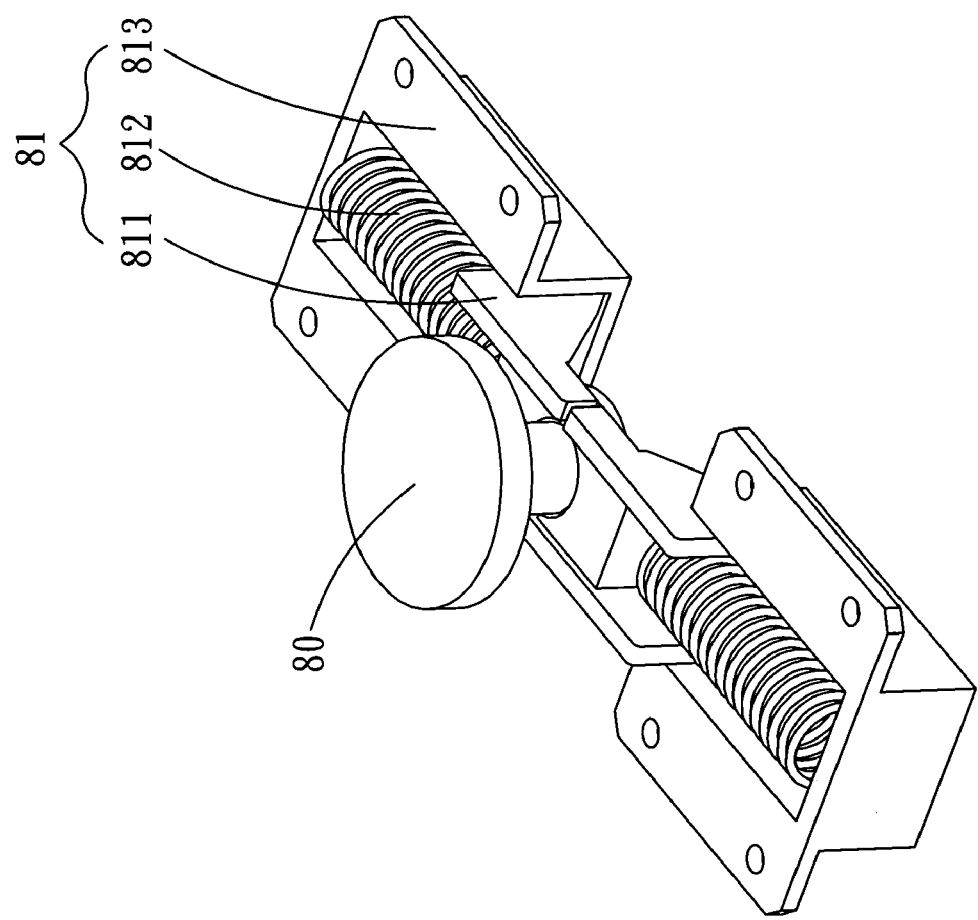
FIG. 3I is an assembled view of the convex portion and the engaging carriage.
Figure 3J:
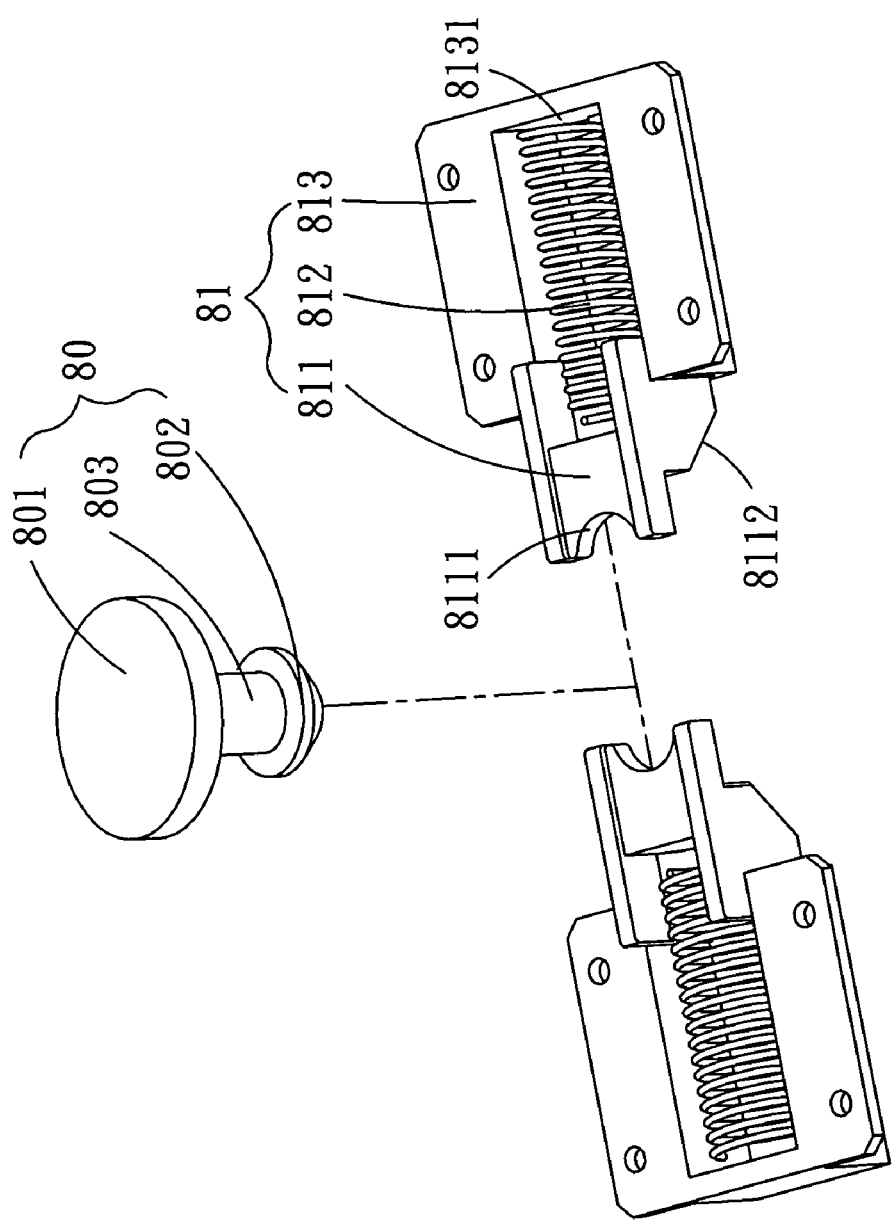
FIG. 3J is an exploded view of the convex portion and the engaging carriage.

Please refer to FIG. 3I and FIG. 3J, which are the assembled diagram and the exploded diagram of the convex portion and the engaging carriage respectively. As shown in figures, the convex portion 80 includes a disc part 801 in the top, a cone part 802 in the bottom and a cylindrical part 803 connected to the disc part 801 and the cone part 802, wherein the disc part 801 is located in the base plate 131, the tip of the cone part 802 faces down, and the radius of the cylindrical part 803 is smaller than the cone part 802. The engaging slide seat 81 includes an engaging head 811, a spring 812 and a slide seat 813. The spring 812 is located in the groove 8131 of the slide seat 813 and connected to the engaging head 811 and the slide seat 813. The engaging head 811 is also located in the groove 8131 of the slide seat 813. In addition, the front edge of the engaging head 811 has a semi-circular concave part 8111. The two semi-circular concave parts 8111 can be combined as a circle with the radius substantially equal to the radius of the cylindrical part 803 of the convex portion 80 when the two engaging slide seats 81 are installed corresponding to each other. The cone part 802 of the convex portion 80 touches the engaging head 811 of the engaging slide seat 81 first, and makes the spring 812 generate elastic deformation to shift the engaging head 811 back into the groove 8131 of the slide seat 813 when the convex portion 80 located in the bottom of the construction tank 131 goes through the corresponding hole (not shown) on the lifting platform 61. Then, the cone part 802 of the convex portion 80 can go through the engaging head 811. After the cone part 802 goes through the engaging head 811, the engaging head 811 and the spring, 812 move back to the original location, and the cylindrical part 803 of the convex portion 80 is covered by the semi-circular concave parts 8111 of the engaging head 811, so as to engage the convex portion 80 with the engaging carriage, and thus the base plate 131 can be fixed on the lifting platform 61.

Please refer to FIG. 3C and FIG. 3D again. The lower plate element 622 of the loading platform 62 further comprises at least a supporting seat 82, which is installed corresponding to the engaging carriage in the bottom of the lifting platform 61. The top side of the supporting seat 82 has a concave part 821, which can put the cone part 802 of the convex portion 80 inside, and two sides of the supporting seat 82 respectively have an inclined plane 822, which is corresponding to the inclined plane 8112 in the bottom of the engaging head 811 of the engaging slide seat 81 (as shown in FIG. 3J).

Figure 3L:
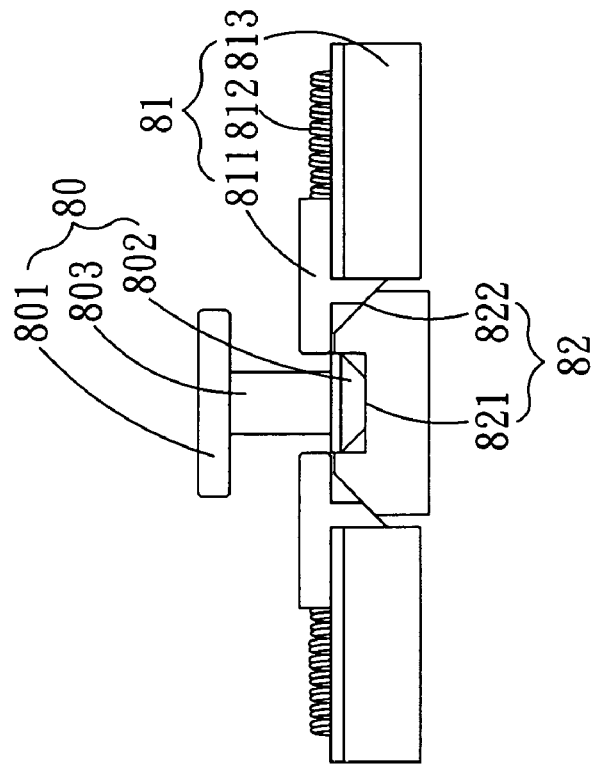
FIG. 3L is a side view of separating the convex portion and the engaging carriage.
Figure 3K:
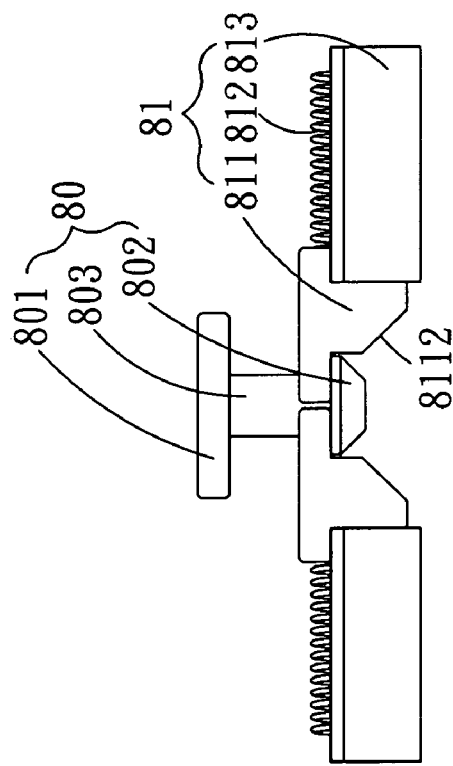
FIG. 3K is a side view of assembling the convex portion and the engaging carriage.

Please refer to FIG. 3K and FIG. 3L. FIG. 3K is a side view of assembling the convex portion and the engaging carriage, and FIG. 3L is a side view of separating the convex portion and the engaging carriage. As shown in figures, during the process of forming the three-dimensional object, the convex portion 80 is engaged with the engaging carriage (as shown in FIG. 3I and FIG. 3K), to fix the base plate 131 on the lifting platform 61. The base plate 131 and the lifting platform 61 fall to the bottom of the construction tank 13 when the three-dimensional object is formed. At the time, the engaging head 811 of the engaging slide seat 81 touches the supporting seat 82, and pushes the engaging head 811 out to shift it back into the groove 8131 of the slide seat 813 by using the traction between the inclined plane 8112 of the engaging head 811 and the inclined plane 822 of the supporting seat 82 and the elastic deformation of the spring 812. The distance between two engaging heads 811 is larger than the radius of the cone part 802 of the convex portion 80, and the convex portion 80 is not engaged with the engaging carriage. Namely, the base plate 131 and the lifting platform 61 can be separated to disassemble the construction tank 13 from the three-dimensional forming device 1.

Therefore, during the process of forming the three-dimensional objects, the tank body 130 of the construction tank 13 can be fixed on the loading platform 62 of the lifting portion 60 through the function of the convex fasteners 132 and the buckle parts 63, and the base plate 131 can be fixed on the loading platform 62 of the lifting portion 60 through the function of the convex portion 80 and the engaging carriage, so that the base plate 131 can rise or fall inside the construction tank 13 with the rising or falling of the lifting platform 61. The base plate 131 and the lifting platform 61 fall to the bottom of the construction tank 13 when the three-dimensional object is formed. At the time, the convex fasteners 132 and the buckle parts 63 are separated (as shown in FIG. 3F), and the convex portion 80 and the engaging carriage are separated (as shown in FIG. 3L), so that the construction tank 13 is not fixed on the loading platform 62 and the base plate 131 is also not fixed on the lifting platform 61. The base plate 131 can be loaded on the convex block 133, which protrudes forward to the inner of the construction tank 13, in the bottom of the construction tank 13 (as shown in FIG. 3F). Thus, the construction tank 13 and the base plate 131 can be removed from the desk-top three-dimensional object forming apparatus 1 to proceed sieving and taking the formed three-dimensional object out from the construction tank 13 in other place. Hence, the problem of the working environment polluted by the flying powder when taking out the finished production in the prior art can be solved.

Figure 4:
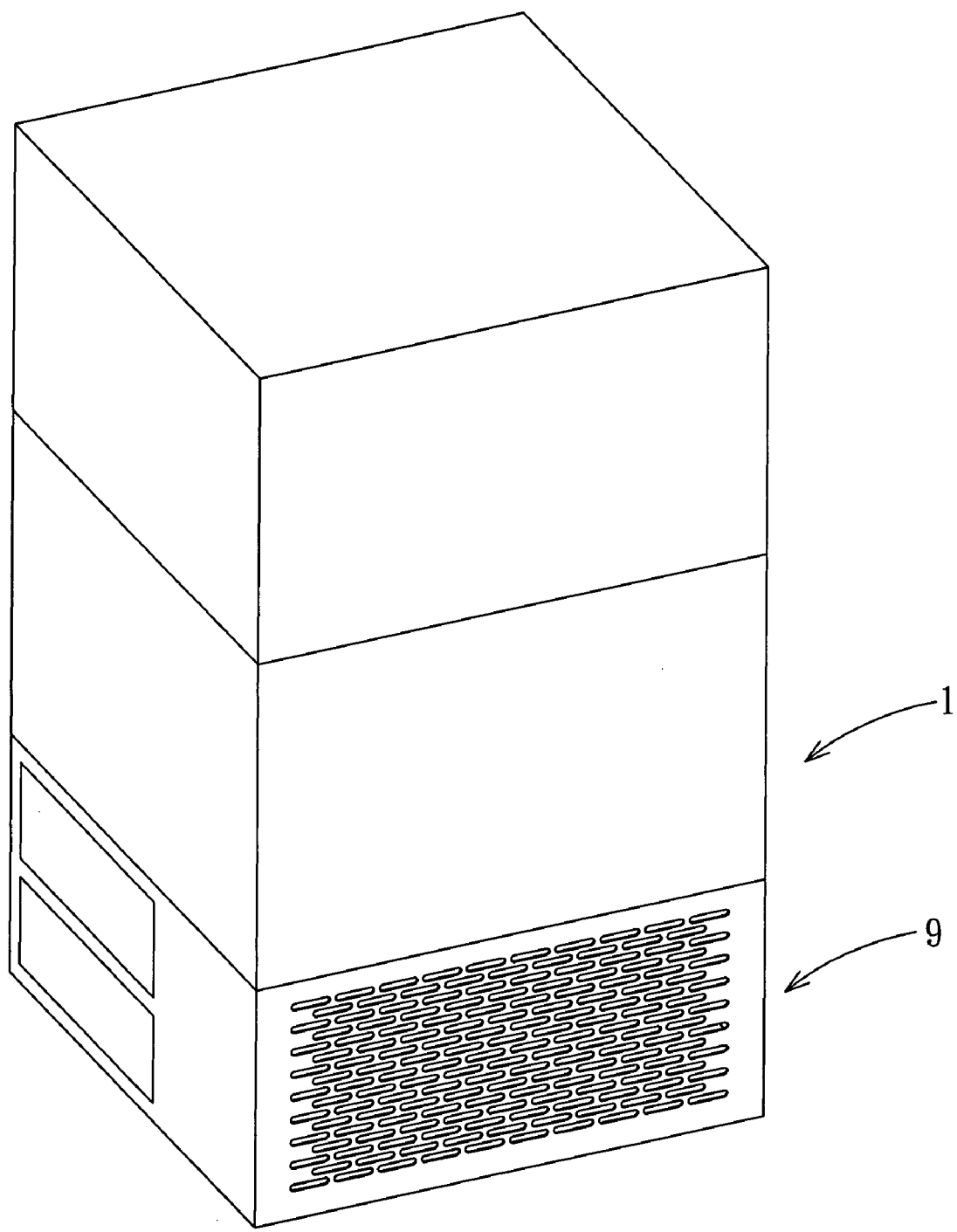
FIG. 4 is a three-dimensional structure diagram of the three-dimensional object forming apparatus assembled with the filtering portion according to the invention.

During the process of spreading powder, the lighter or smaller construction powder may fly in the working space to cause dust that pollutes the working space. Thus, as shown in FIG. 4, the three-dimensional object forming apparatus 1 of the present invention improves the recovery efficiency of the construction powder by using a filtering portion 9.

Figure 5A:
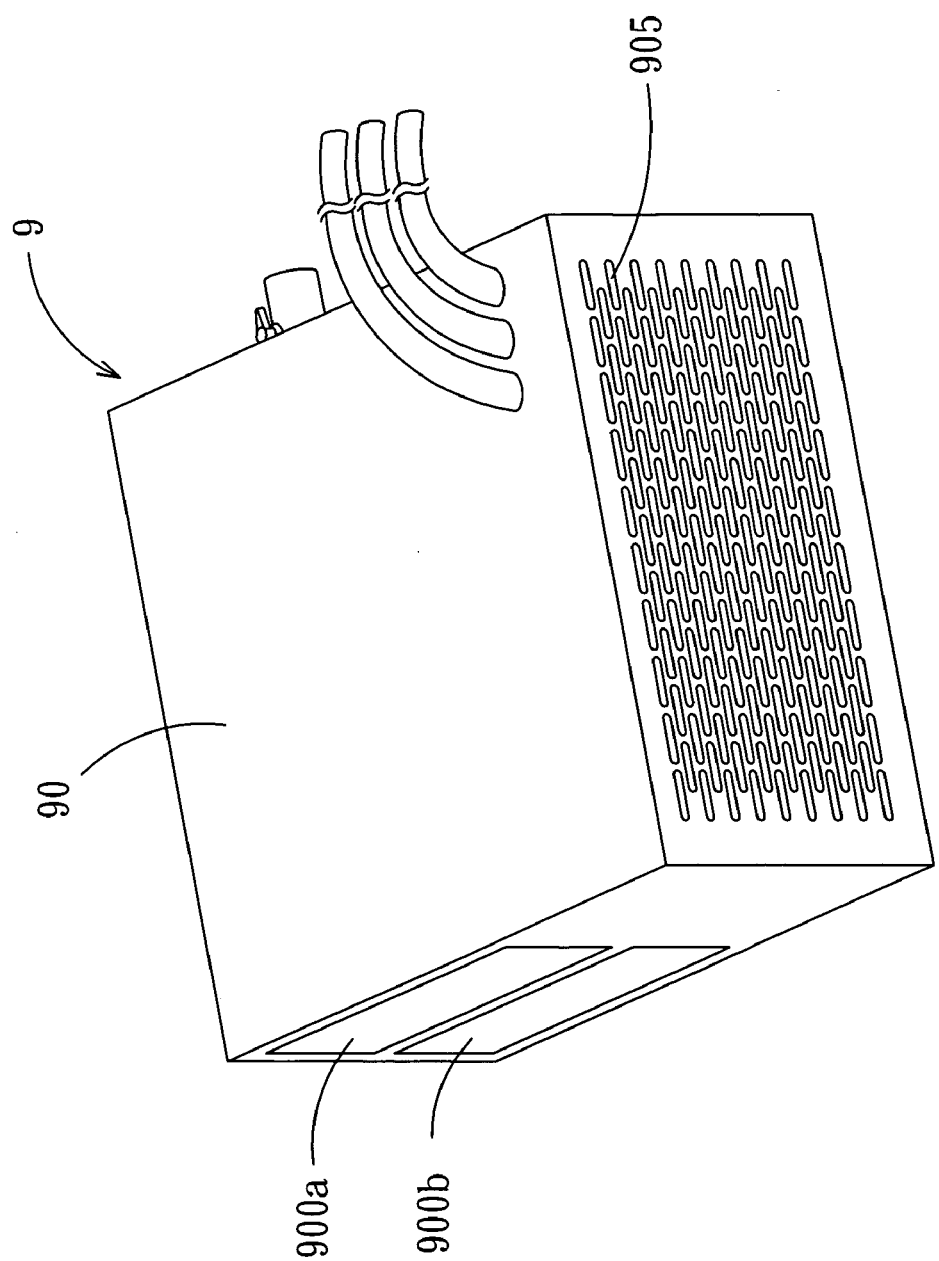
FIG. 5A is a schematic diagram of the filtering portion in FIG. 4.
Figure 5B:
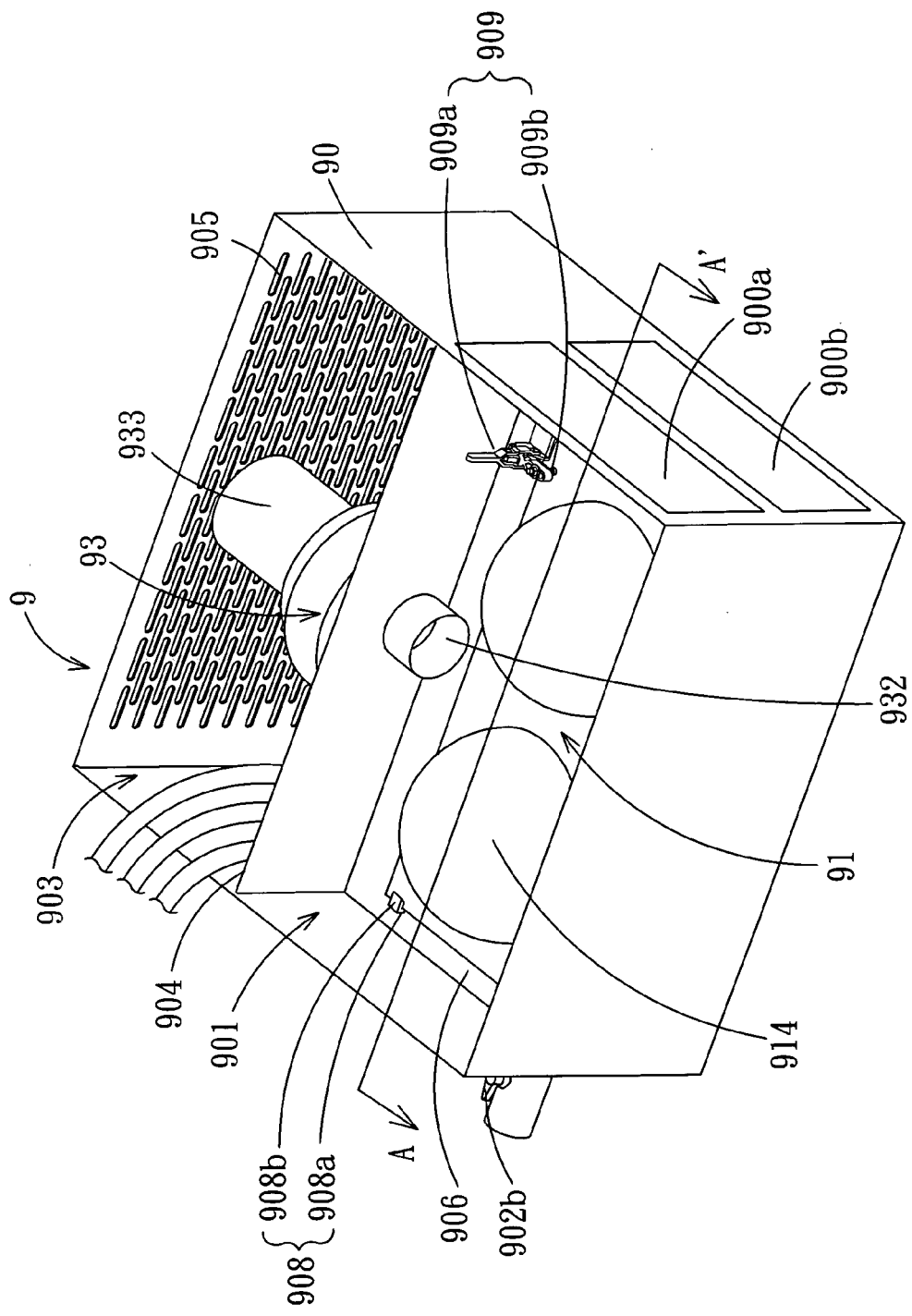
FIG. 5B is a schematic drawing of one preferred embodiment of the inner structure of the filtering portion in FIG. 5A.
Figure 5C:
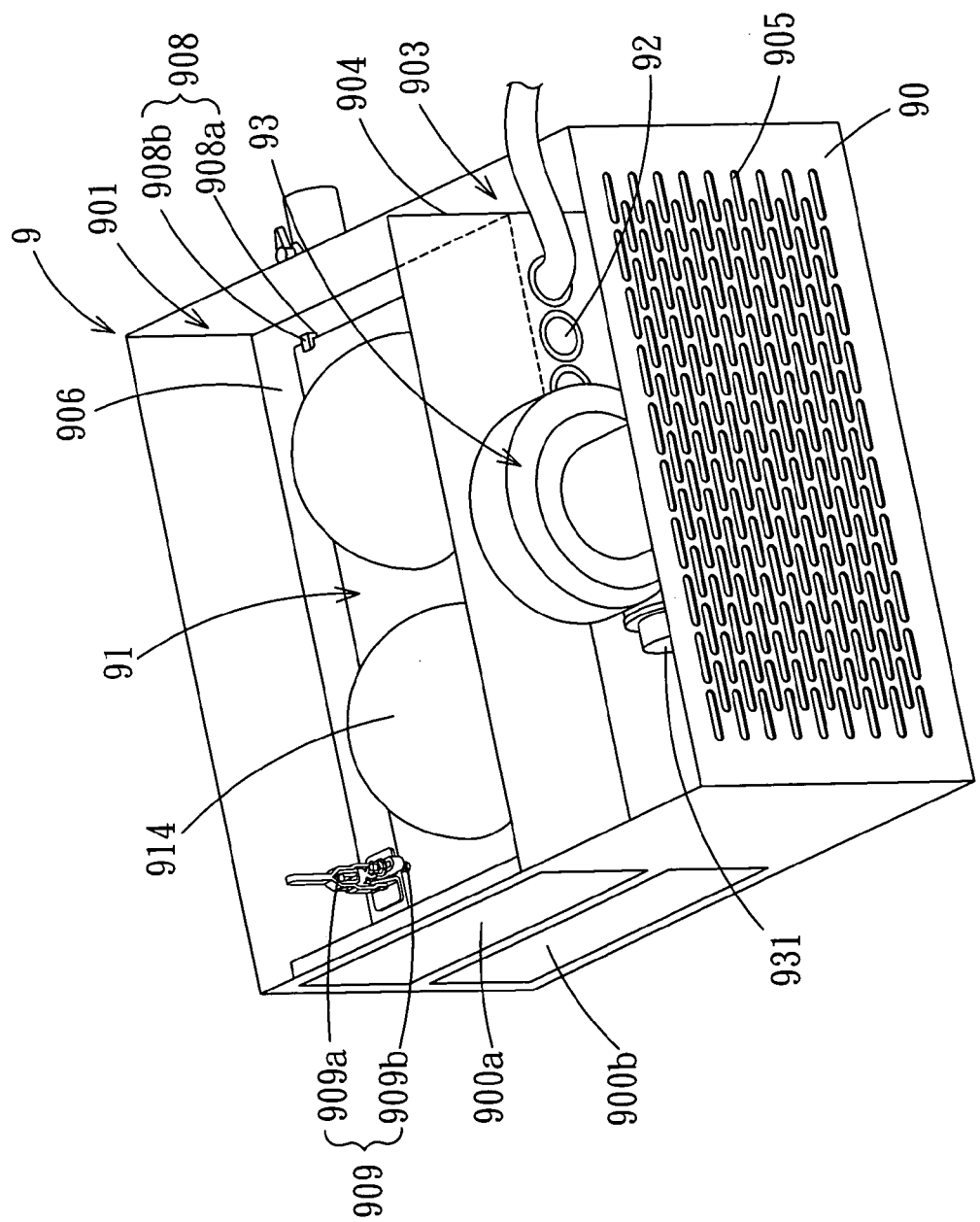
FIG. 5C is a schematic diagram of FIG. 5B from another viewing angle.
Figure 5D:
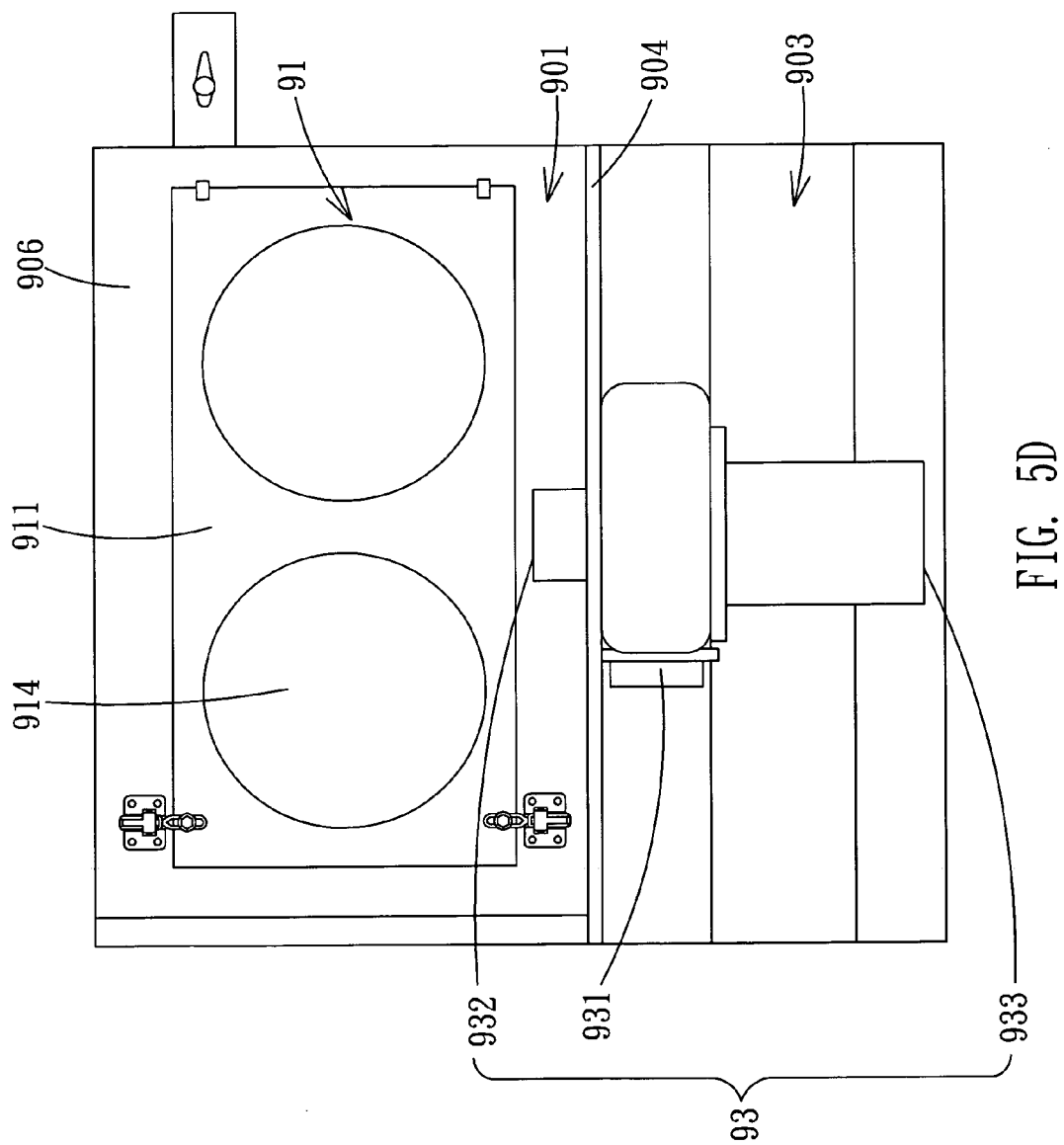
FIG. 5D is a top view diagram of FIG. 5B.
Figure 5E:
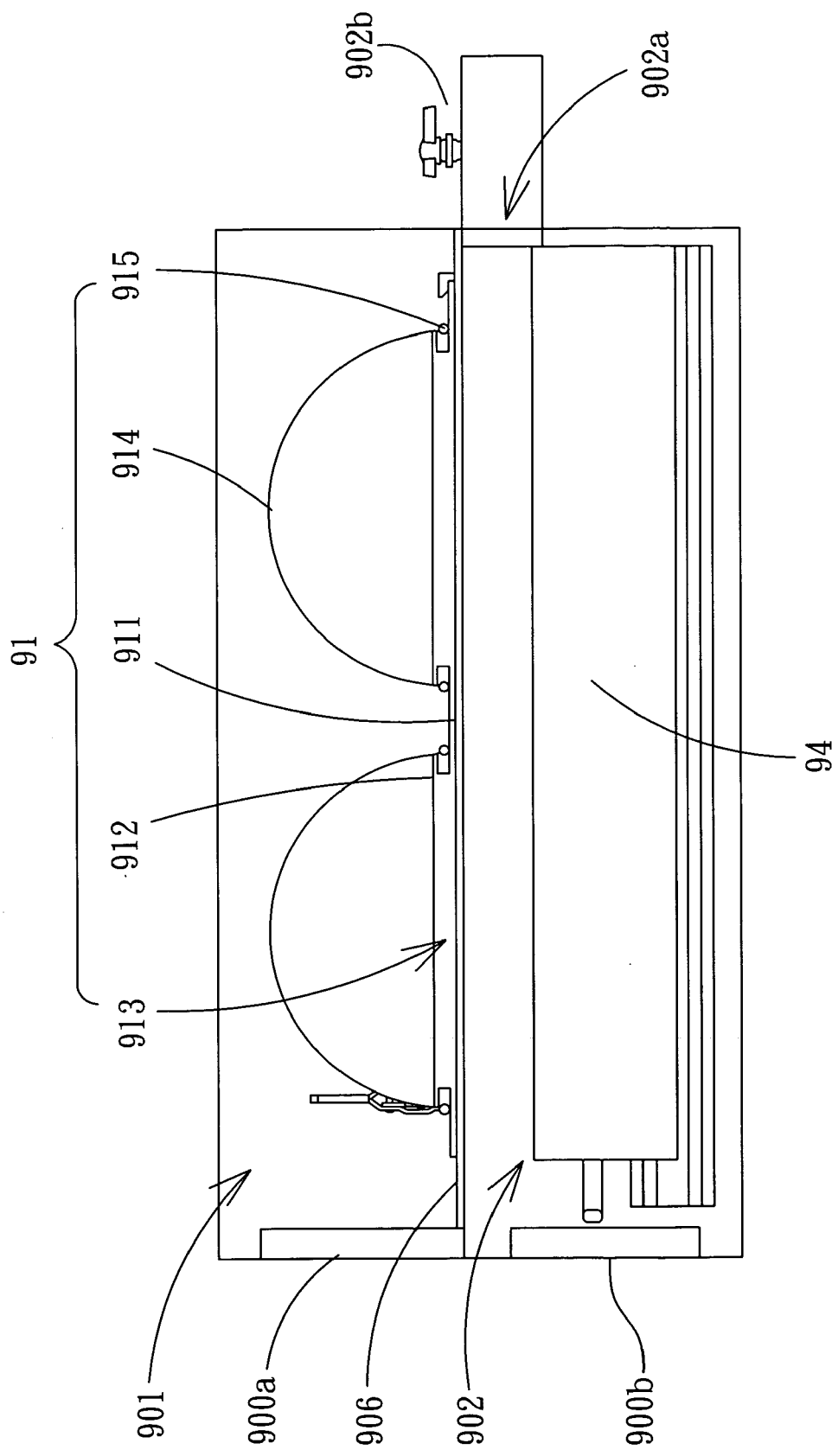
FIG. 5E is a cross-sectional view of FIG. 5B taken along a line A-A'.
Figure 5F:
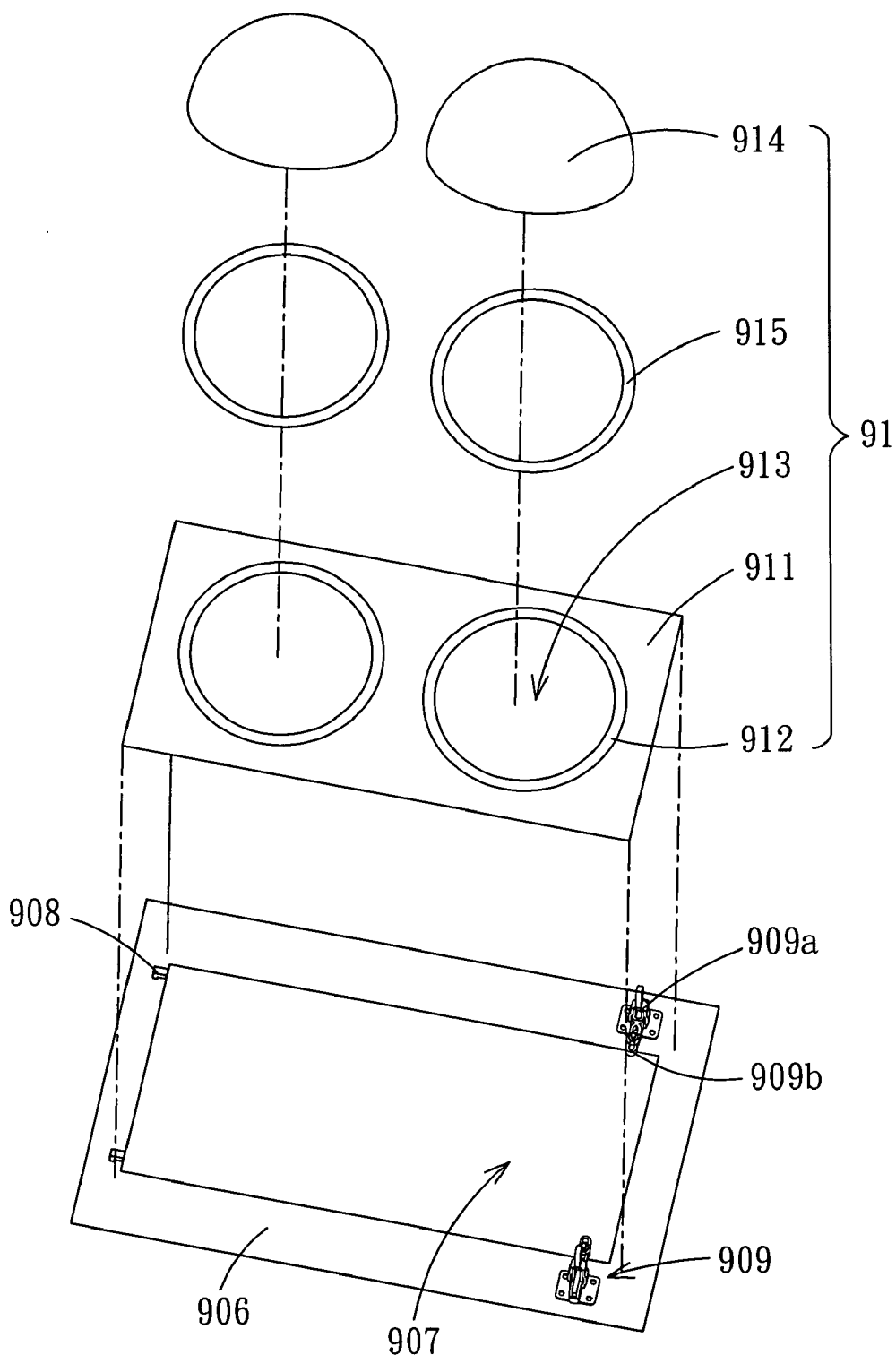
FIG. 5F is an exploded view of the frame board of the filtering portion and the dust filtering module in FIG. 5B.

Please refer to FIGS. 5A-5E. FIG. 5A is a schematic diagram of the filtering portion in FIG. 4. FIG. 5B is a schematic drawing of one preferred embodiment of the inner structure of the filtering portion in FIG. 5A. FIG. 5C is a schematic diagram of FIG. 5B from another viewing angle. FIG. 5D is a top view of FIG. 5B. FIG. 5E is a cross-sectional view of FIG. 5B taken along a line A-A'. As shown in FIGS. 5A-5C, the filtering portion 9 includes a housing 90, a dust filtering module 91, a dust suction inlet 92 and a suction module 93. The housing 90 further include a first space 901, a second space 902 (as shown in FIG. 5E) and a third space 903. The third space 903 is separated from the first and the second spaces 901, 902 by a partition plate 904. The first space 901 is preferably set above the second space 902. The dust filtering module 91 is installed between the first and second spaces 901, 902 to separate the first space 901 from the second space 902 by the dust filtering module 91. Besides, a frame board 906 can be installed between the first space 901 and the second space 902, which is substantially vertical to the walls of the housing 90 and the partition plate 904 and defines an opening 907 (as shown in FIG. 5F), wherein the shape of the opening 907 is preferably rectangular. The frame board 906 is preferably integrally formed with the housing 90 and the partition plate 904, for loading the dust filtering module 91 installed on it.

Please refer to FIG. 5D, FIG. 5E and FIG. 5F. FIG. 5F is an exploded view of the frame board of the filtering portion and the dust filtering module in FIG. 5B, wherein the housing 90 and the partition plate 904 are not shown in FIG. 5F to conveniently illustrate the relationship between the dust filtering module 91 and the frame board 906. As shown in FIG. 5F, a fastener 908 and a clamping element 909 can be set on the frame board 906. For example, two fasteners 908 and two clamping elements 909 are preferably set near the corners of the opening 907, such as set near the four corners of the rectangular opening 907 in this embodiment for illustrative purpose. The fastener 908 further includes a first part 908a and a second part 908b. The first part 908a is substantially vertical to the frame board 906 and extended upward, and the second part 908b is approximately vertical to the first part 908a and extended in the direction facing to the opening 907 (as shown in FIG. 5B and FIG. 5C). The clamping element 909 further includes a press part 909a and a prop part 909b (as shown in FIG. 5B). The prop part 909b can be moved by pressing and releasing the press part 909a. Hence, the action of the dust filtering module 91 can be restricted by the fastener 908 and the clamping element 909, so as to securely fix the dust filtering module 91 with respect to the frame board 906.

Please refer to FIG. 5F and FIG. 5E. The dust filtering module 91 of this embodiment further includes a base plate 911, a flange ring 912, a hole 913, a dust collection bag 914 and a washer 915. The shape of the base plate 911 is approximately of a rectangular shape, and the area of the base plate 911 is substantially larger than that of the opening 907 defined by the frame board 906. The hole 913 is installed through on the base plate 911. The flange ring 912 is substantially protruded out with respect to the base plate 911 and set surrounding the edge of the hole 913. The dust collection bag 914 is corresponding to the hole 913 and hitched on the flange ring 912 to seal the hole 913.

In this embodiment, the dust collection bag 914 can be a replaceable dust collection bag and the material thereof is preferably non-woven fabric. The shape of the dust collection bag 914 may substantially be an arc-shaped structure, such as a semicircular arc shape to increase the filtering area of the dust collection bag 914. Besides, in order to firmly fix the dust collection bag 914 on the base plate 911, the dust filtering module 91 hitches the washer 915 outside the dust collection bag 914 and the flange ring 912, i.e. the overlapping area of the dust collection bag 914 and the flange ring 912 (as shown in FIG. 5E) to prevent the dust collection bag 914 from draping, resulting in that the dust filtering effect cannot be achieved during using. In this embodiment, the number of the base plate 911, the flange ring 912, the hole 913, the dust collection bag 914 and the washer 915 is preferably, but not limited to, two, which may be changed based on the actual requirement.

Please refer to FIGS. 5B-5E. After the dust filtering module 91 of this embodiment is composed by steadily fixing the dust collection bag 914 on the base plate 911 through the washer 915, the dust filtering module 91 can be installed between the first space 901 and the second space 902 of the housing 90. The base plate 911 of the dust filtering module 91 can be fixed on the frame board 906 by setting the fastener 908 and the clamping element 909, so as to cover the opening 907 and separate the first and the second space 901, 902 by using the dust filtering module 91. The dust collection bag 914 of the dust filtering module 91 is set in the first space 901, in other words, the arc-shaped structure of the dust collection bag 914 is substantially protruded out in the direction facing the first space 901.

Please refer to FIG. 5B, FIG. 5C and FIG. 5D. In this embodiment, the suction module 93 can be located in the third space 903 and fixed with respect to the partition plate 904 through, for example, locking or the like. The suction module 93 includes a motor 931, a suction outlet 932 and an exhaust outlet 933 corresponding to the suction outlet 932. The suction outlet 932 substantially goes through the partition plate 904 and connects to the first space 901, and the exhaust outlet 933 faces multiple exhaust meshes 905, so as to suck the air of the first space 901 and exhaust it outside the housing 90 through the exhaust outlet 933 and the exhaust meshes 905 during the motor 931 of the suction module 93 operating.

Please refer to FIG. 5C and FIG. 5A. The dust suction inlet 92 of the filtering portion 9 goes through the partition plate 904 to connect to the second space 902. In the embodiment, the number of the dust suction inlets 92 is preferably, but not limited to, three. The second end part 952 of the pipe element 95 of the present invention firmly connects to the dust suction inlet 92. The first end part 951 corresponding to the second end part 952 goes through the housing 90. In order to show the dust suction inlet 92, not all of the pipes 95 are shown in FIG. 5C. Besides, as shown in FIG. 5E, the filtering portion 9 further comprises a recycling unit 94, such as a recycling box, which is located in the second space 902. The second space 902 may be optionally provided with a through hole 902a. The opening and closing of the through hole 902a is controlled by using a valve 902b. Moreover, a first cover element 900a and a second cover element 900b are set in the housing 90, which are corresponding to the first space 901 and the second space 902 respectively, for sealing the first and second space 901, 902 when the first and second cover element 900a, 900b are closed, and for allowing users to take out the dust filtering module 91 and the recycling unit 94 when the first and second cover element 900a, 900b are opened.

Please refer FIG. 4 together with FIG. 5A-5C and FIG. 5E. The filtering portion 9 can be installed under the three-dimensional object forming apparatus 1 when the filtering portion 9 and the three-dimensional object forming apparatus 1 are combined together, and the first end part 951 of the pipe elements 95 penetrated through the housing 90 of the filtering portion 9 may be set on the three-dimensional object forming apparatus 1, so that the working space of the three-dimensional object forming apparatus 1 can be communicated with the filtering portion 9 through the pipe elements 95.

When the three-dimensional object forming apparatus 1 is operating, the suction module 93 of the filtering portion 9 should start to suck and exhaust air from the suction outlet 932 and the exhaust outlet 933 respectively by the driving of the motor 931, so as to generate negative pressure in the first space 901, thereby making the air flow from the second space 902 to the first space 901. Since the second space 902 is communicated with the working space through the pipe elements 95, the dust such as the construction powder flying in the operating space may be sucked into the second space 902 through the pipe elements 95 and the dust suction inlet 92 by the negative pressure in the first space 901 during the operating process of the three-dimensional object forming apparatus 1.

Since the second space 902 is separated from the first space 901 by the dust filtering module 91, dust entered into the second space 902 may be stopped by the dust filtering module 91 and collected in the second space 902, so as to prevent dust from entering the first space 901 and being sucked into the suction module 93, which may damage the suction module 93. Besides, since the recycling unit 94 is installed in the second space 902 and the second space 902 is located under the first space 901, the dust collecting in the second space 902 may fall into the recycling unit 94 by gravity, so as to use the recycling unit 94 to collect the dust sucked into the filtering portion 9.

The suction module 93 of the filtering portion 9 may stop after finishing the operation of the three-dimensional object forming apparatus 1. Therefore, users may open the first cover element 900a, press the press part 909a of the clamping element 909 to release the dust filtering module 91 from propping by the prop part 909b to thereby take out the dust filtering module 91, and then remove the dust collection bag 914 of the dust filtering module 91 to clean or replace for preventing dust accumulation from affecting the filtering effect. Of course, users also can open the cover element 900b and take out the recycling unit 94 located in the second space 902 to get the dust in the recycling unit 94. Besides, in order to clean the second space 902, a suction device (not shown) may be connected to the valve 902b with it opened, so as to facilitate sucking the dust remained in the second space 902 by using the suction device. In some embodiments, the filtering portion 9 continues operating when the cover 11 is opened and taking the three-dimensional finished products, so as to prevent too much dust from dispersing into the air.

From above, flying dust, such as the construction powder, can be sucked into the second space 902 of the filtering portion 9 from the dust suction inlet 92 through the pipe elements 95 by operating the suction module 93 of the filtering portion 9 to generate a negative pressure in the first space 901 during the operating process of the three-dimensional object forming apparatus 1. Then, flying dust can be collected in the second space 902 through the dust filtering module 91 for being recycled by the recycling unit 94, thereby ensuring that the operation of the three-dimensional object forming apparatus 1 may not be affected by the flying dust and thus recycling dust efficiently. Comparing to the prior art, the present invention almost has double cleaning ability. Besides, with the use of the dust filtering module 91, it is able to prevent the suction module 93 from being destroyed due to sucking dust.

Figure 6:
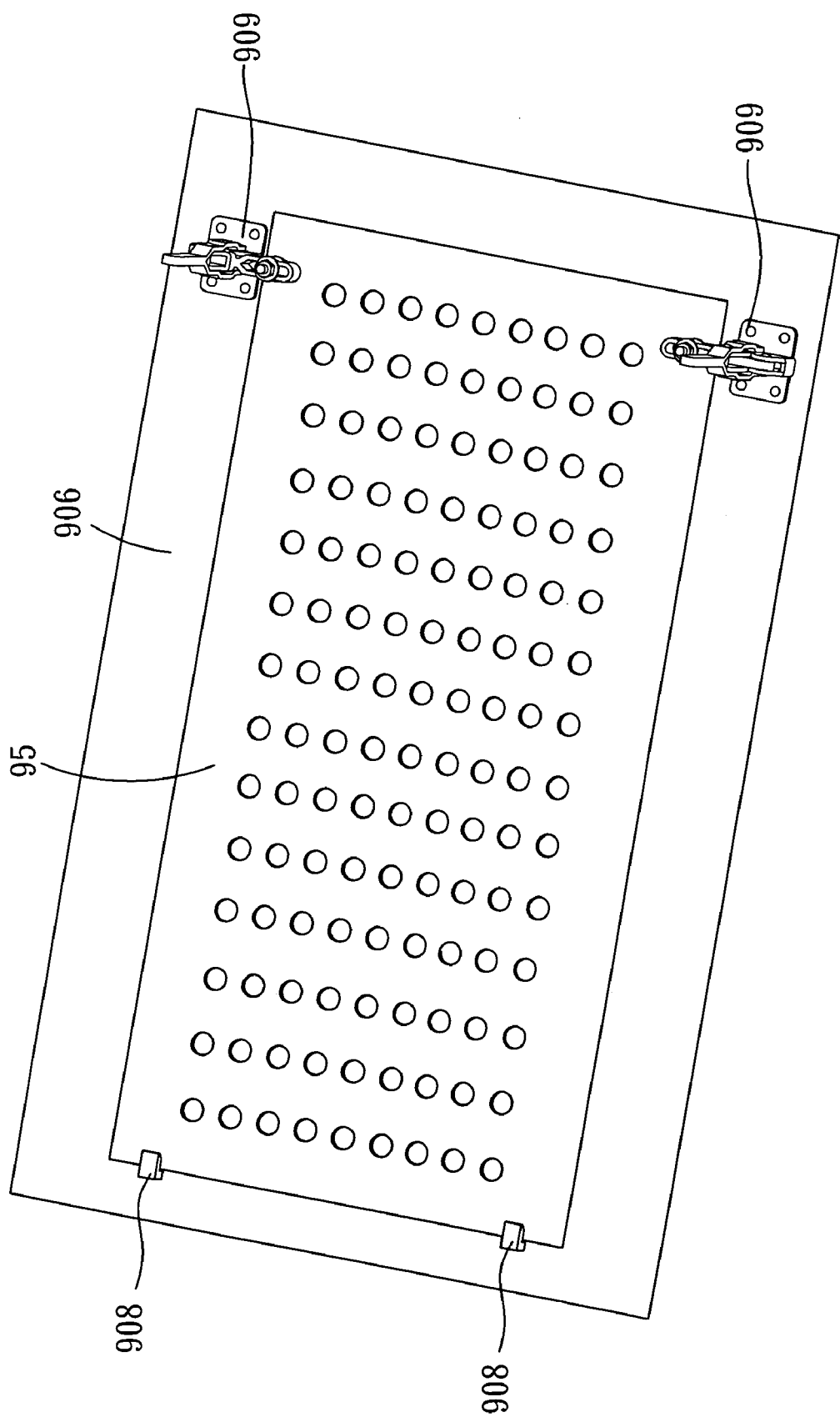
FIG. 6 is a schematic diagram of the dust filtering module of the filtering portion configured in the frame board according to the invention.

The dust filtering module 91 used in the filtering portion 9 of the present invention is not limited to the above embodiment. Please refer to FIG. 6, which is a schematic diagram of the dust filtering module 91 of the filtering portion 9 configured in the frame board 906 according to another embodiment of the invention. As shown in FIG. 6, the dust filtering module 95 of this embodiment can be a sponge with high density meshes, the shape can be of a rectangular shape and substantially larger than the opening 907 defined by the frame board 906, so as to firmly fix the sponge with high density meshes between the first and second space 901, 902 and seal the opening 907 by using the fasteners 908 and the clamping elements 909. The operation of the filtering portion 9 composed of the sponge with high density meshes as the dust filtering module 95 is similar to the first preferred embodiment shown in FIGS. 5B-5F and thus a detailed description is deemed unnecessary. Besides, it can be understood that the numbers of the pipe elements 95 and the dust suction inlets 92 are both three for illustrative purpose, but the numbers can be changed based on the actual requirement of the three-dimensional object forming apparatus 1, and the location of the first end part 951 of the pipe element 95 can also be changed, not limited as in the embodiments.

In addition, the three-dimensional object forming apparatus 1 of the present invention further comprises a print quality inspection module, which includes frosted glass (not shown) installed on the base platform 10. The frosted glass is used for printing figure on the rough surface thereof, such that the printing liquid fills in the low-lying part thereby making it to be smooth as general glass, and thus light going through the frosted glass renders regular refraction and then the print quality of the nozzles 52 can be observed. Therefore, whether the nozzles 52 (as shown in FIG. 2F) of the print module 11 are blocked or not can be determined by detecting the figure printed on the frosted glass before the print module 11 is operating. If the they are blocked, the print module 11 should be cleaned up first, otherwise, the print module 11 could proceed the subsequent printing operation on the base platform 10.

In conclusion, the three-dimensional object forming apparatus of the present invention has a movable powder supplying tank to achieve the purpose of saving drying time and easily taking out, and the powder supplying tank with sectional powder supplying function and heating function can average the density of spreading powder and speed up the drying rate to shorten the total forming time. The device of the present invention is also provided with the dustproof design for separating printing area and powder spreading area, so as to prevent decreasing the work quality caused by flying dust during printing. Whether the nozzles are blocked or not also can be determined by using the print quality inspection module. Besides, the nozzle cleaning module and the nozzle sealing module provided by the invention can achieve the entirely dustproof and anti-dry effect of the nozzles by using the spray portion and wipers to proceed thorough cleaning to the nozzles after the nozzles complete printing and to seal the nozzles in the nozzle sealing module with humidity controlling function. In addition, the detachable construction tank of the present invention can remove the construction tank and the formed three-dimensional objects and set up another construction tank for continuing printing, and the process of sieving and taking out the finished products can be proceeded in other place. In this way, the problem of the working environment polluted by the flying powder in the prior art can be solved.

In addition, the filtering portion of the present invention generates negative pressure by the suction module, so as to suck the flying construction powder in the working space into the filtering portion by using negative pressure and dust reduction technology, thereby maintaining the working space clean. The construction powder sucked into the filtering portion can be collected and recycled by the recycling unit through filtering by the dust filtering module, so as to prevent dust from entering the suction module to cause damage, thereby ensuring that the three-dimensional object forming apparatus can be operating in a good environment without being affected by the flying dust and the construction powder can be recycled efficiently.

Although the present invention has been explained in relation to its preferred embodiments, it is to be understood that many other possible modifications and variations can be made without departing from the scope of the invention as hereinafter claimed.

What is claimed is:

1. A three-dimensional object forming apparatus for forming a three-dimensional object, the three-dimensional object forming apparatus comprising:
   a base platform;
   a detachable construction tank arranged on the base platform, including a tank body and a base plate;
   a movable powder supplying tank arranged on the base platform for being driven by a transmission portion to supply construction powder above the detachable construction tank;
   a print module arranged on the base platform, including at least a print cartridge with at least a nozzle;
   a heating portion installed on the front end of the movable powder supplying tank for performing heating process after each printing;
   a lifting portion arranged on the base platform, including a lifting platform and a loading platform, wherein the lifting platform is located under the detachable construction tank for carrying the base plate of the detachable construction tank to control a lifting height of the base plate during forming the three-dimensional object, and the loading platform is provided for carrying the tank body of the detachable construction tank;
   a nozzle cleaning module arranged on the base platform, having a spray portion and at least a wiper, wherein the spray portion disperses liquid to the at least a nozzle by using a spray pipe;
   a nozzle sealing module arranged on the base platform, including a holder, at least a sealing portion and a moisture portion; and
   a stretchable dust-proof cover connected to a side of the powder supplying tank for moving together with the powder supplying tank to cover the construction powder in the construction tank.

2. The three-dimensional object forming apparatus as claimed in claim 1, wherein bottoms of two sides of the tank body of the detachable construction tank include at least a convex fastener respectively, and the base plate of the detachable construction tank includes at least a convex portion.

3. The three-dimensional object forming apparatus as claimed in claim 2, wherein the loading platform of the lifting portion includes at least a buckle part, which is set up corresponding to the at least a convex fastener of the detachable construction tank, and buckles to the at least a convex fastener, so as to fix the tank body of the detachable construction tank on the loading platform.

4. The three-dimensional object forming apparatus as claimed in claim 3, wherein the at least a buckle part of the loading platform includes a hooking part, a buckling slide seat and a buckling slide block, the hooking part and the at least a convex fastener buckle to each other, an elastic element is installed in the buckling slide seat, and the buckling slide block has an inclined plane.

5. The three-dimensional object forming apparatus as claimed in claim 4, wherein a bottom side of the lifting platform of the lifting portion includes at least a convex block, which has a inclined plane, the inclined plane of the convex block touches the inclined plane of the buckling slide block and pushes the buckle part out when the lifting platform goes down to a bottom of the detachable construction tank, then the convex fastener of the detachable construction tank and the hooking part of the buckle part are separated, so as to make the detachable construction tank depart from the lifting portion.

6. The three-dimensional object forming apparatus as claimed in claim 2, wherein a bottom side of the lifting platform of the lifting portion includes at least an engaging carriage, the base plate of the detachable construction tank engages with the engaging carriage through the convex portion for being fixed on the lifting platform.

7. The three-dimensional object forming apparatus as claimed in claim 6, wherein the convex portion of the detachable construction tank includes a cylindrical part and a cone part connected to a bottom of the cylindrical part, a cone tip of the cone part faces down, and a radius of the cylindrical part is smaller than the cone part.

8. The three-dimensional object forming apparatus as claimed in claim 7, wherein the engaging carriage includes two engaging slide seats, each of the engaging slide seat includes an engaging head, a spring and a slide seat, a front edge of the engaging head has a semi-circular concave part for surrounding the cylindrical part of the convex portion, so as to engage the convex portion with the engaging carriage, thereby fixing the base plate of the detachable construction tank on the lifting platform.

9. The three-dimensional object forming apparatus as claimed in claim 8 wherein the loading platform of the lifting portion includes at least a supporting seat, which is installed corresponding to the engaging carriage of the bottom side of the lifting platform.

10. The three-dimensional object forming apparatus as claimed in claim 9, wherein each of the two engaging heads of the engaging carriage has an inclined plane, and each of two sides of the supporting seat has an inclined plane, the inclined plane of the engaging head touches the inclined plane of the supporting seat and pushes the engaging head out when the lifting platform goes down to the bottom of the detachable construction tank, and then the convex portion is not engaged with the engaging carriage, the base plate of the detachable construction tank and the lifting platform are separated to make the detachable construction tank depart from the lifting portion.

11. The three-dimensional object forming apparatus as claimed in claim 1, wherein the detachable construction tank further includes a convex block, which is installed on a bottom of the detachable construction tank and protruded towards an inside of the detachable construction tank, and is provided for loading the base plate of the detachable construction tank when the detachable construction tank departs from the lifting portion.

12. The three-dimensional object forming apparatus as claimed in claim 1, wherein a bottom of the powder supplying tank has multiple elongated holes, the movable powder supplying tank has a stirring rod, an eccentric wheel and a plate element with multiple elongated slots inside, the stirring rod connects to the eccentric wheel to drive the plate element to move around, thereby supplying powder when the elongated slots of the plate element and the holes in the bottom of the powder supplying tank are aligned with each other.

13. The three-dimensional object forming apparatus as claimed in claim 1, wherein the heating portion further includes a temperature sensor for sensing a temperature of the heating portion to control the heating process.

14. The three-dimensional object forming apparatus as claimed in claim 1, wherein the at least a wiper of the nozzle cleaning module is installed corresponding to the at least a nozzle for touching the at least a nozzle, and being driven by a driving device to move on a surface of the at least a nozzle so as to scrape residue from the at least a nozzle.

15. The three-dimensional object forming apparatus as claimed in claim 1, wherein the moisture portion of the nozzle sealing module has a atomizer for atomizing water to spray mist into an inside of the holder, and a side of the at least a sealing portion has a slot for allowing mist to enter and disperse to the at least a nozzle.

16. The three-dimensional object forming apparatus as claimed in claim 1, further comprising frosted glass installed on the base platform for allowing the print module to print a figure on the frost glass, so as to detect and determine whether the print module is blocked.

17. The three-dimensional object forming apparatus as claimed in claim 1, further comprising a filtering portion, which includes a housing, a dust filtering module, a dust suction inlet and a suction module, the housing has a first space and a second space separated by the dust filtering module, the dust suction inlet is communicated with the second space to permanently connect to a tube element of a communicating operating space, and the suction module is communicated with the first space to generate negative pressure in the first space, so as to suck up dust flying in the operating space into the second space for collecting and recycling the dusk.

18. The three-dimensional object forming apparatus as claimed in claim 1, further comprising a continuous liquid supply module for supplying liquid to the at least a print cartridge of the print module, so as to perform printing process on the construction powder.

\* \* \* \* \*